(12) United States Patent
Ren et al.

(10) Patent No.: US 9,346,556 B2
(45) Date of Patent: May 24, 2016

(54) METHOD AND APPARATUS FOR PROVIDING IN-FLIGHT WEATHER DATA

(75) Inventors: Liling Ren, Rexford, NY (US); Joel Kenneth Klooster, Grand Rapids, IL (US); Harold Woodruff Tomlinson, Jr., Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 428 days.

(21) Appl. No.: 13/563,406

(22) Filed: Jul. 31, 2012

(65) Prior Publication Data

US 2014/0039733 A1 Feb. 6, 2014

(51) Int. Cl.
  *G06F 7/70* (2006.01)
  *B64D 45/00* (2006.01)
  *G08G 5/00* (2006.01)

(52) U.S. Cl.
  CPC .............. *B64D 45/00* (2013.01); *G08G 5/0013* (2013.01); *G08G 5/0091* (2013.01); *Y02T 50/84* (2013.01)

(58) Field of Classification Search
  None
  See application file for complete search history.

(56) References Cited

U.S. PATENT DOCUMENTS

| | | | |
|---|---|---|---|
| 5,111,400 A * | 5/1992 | Yoder | 701/3 |
| 6,311,107 B1 | 10/2001 | Curto et al. | |
| 6,501,395 B1 | 12/2002 | Ghildiyal | |
| 7,203,596 B2 | 4/2007 | Ledingham et al. | |
| 7,398,057 B2 * | 7/2008 | Stefani et al. | 455/68 |
| 7,471,995 B1 | 12/2008 | Robinson | |
| 7,612,688 B1 | 11/2009 | Vigeant-Langlois et al. | |
| 7,633,428 B1 | 12/2009 | McCusker et al. | |
| 7,945,355 B2 | 5/2011 | Akalinli et al. | |
| 8,055,395 B1 | 11/2011 | Dirks et al. | |
| 8,630,790 B1 * | 1/2014 | Bailey et al. | 701/120 |
| 2002/0039072 A1 | 4/2002 | Gremmert et al. | |
| 2005/0024236 A1 | 2/2005 | Gosdin et al. | |
| 2009/0012663 A1 | 1/2009 | Mead et al. | |
| 2010/0049382 A1 | 2/2010 | Akalinli et al. | |
| 2010/0311354 A1 | 12/2010 | Stayton et al. | |
| 2011/0022294 A1 | 1/2011 | Apley | |
| 2011/0050458 A1 | 3/2011 | Bailey et al. | |
| 2011/0098871 A1 | 4/2011 | Buchanan et al. | |
| 2011/0160940 A1 | 6/2011 | Schapiro | |
| 2013/0085669 A1 * | 4/2013 | Bailey et al. | 701/467 |

FOREIGN PATENT DOCUMENTS

| | | |
|---|---|---|
| AU | 6695201 | 1/2002 |
| WO | WO0201481 | 1/2002 |
| WO | WO2008011572 | 1/2008 |

OTHER PUBLICATIONS

Marcus B. Lowther, Dr. John-Paul Clarke, and Dr. Liling Ren, En Route Speed Change Optimization for Spacing Continuous Descent Arrivals.

(Continued)

*Primary Examiner* — Adam Alharbi
(74) *Attorney, Agent, or Firm* — Pabrita K. Chakrabarti

(57) ABSTRACT

A method for providing one or more aircraft with weather data during flight includes generating a weather model using a source of weather data. The weather model incorporates flight operations information and performance requirements. The method includes generating a weather message from the weather model. The weather message is generated in a format that is compatible with the aircraft. The method also includes transmitting the weather message to the aircraft during flight of the aircraft.

20 Claims, 14 Drawing Sheets

(56) References Cited

OTHER PUBLICATIONS

Liling Ren and John-Paul B. Clarke, Separation Analysis Methodology for Designing Area Navigation Arrival Procedures, Journal of Guidance, Control, and Dynamics, vol. 30.

Tom G. Reynolds, Liling Ren and John-Paul B. Clarke, Advanced Noise Abatement Approach Activities at Nottingham East Midlands Airport, UK.

John-Paul Clarke, Marcus Lowther, Liling Ren, William Singhose, Senay Solak, Adan Vela, Olarence Wong, En Route Traffic Optimization to Reduce Envrionmental Impact.

Search Report from corresponding EP Application No. 13178655.0 dated May 21, 2014.

EP Search Report and Written Opinion dated Jan. 22, 2014, issued in connection with corresponding EP Patent Application No. 13178655.0.

* cited by examiner

METHOD AND APPARATUS FOR PROVIDING IN-FLIGHT WEATHER DATA

BACKGROUND

The subject matter disclosed herein relates generally to weather data, and more particularly, to providing an aircraft with weather data during flight.

Accurate and consistent weather forecast data (such as, but not limited to, air pressure, winds, temperature aloft, and/or the like) is important to optimal flight operations, such as, but not limited to, Optimized Profile Descent (OPD) and the Optimized Profile Climb (OPC) of an aircraft. Currently, an Automatic Terminal Information Service (ATIS) and a Datalink ATIS (D-ATIS) from the Air Navigation Service Provider (ANSP) only broadcast a relatively small set of safety critical weather data, and only for the region of a particular airfield.

In some existing trials of an airline based weather uplink service, an Aircraft Communications Addressing and Reporting System (ACARS) uplinks weather data. But, the data transmission has to be addressed to a specific individual flight (i.e., is not shared among multiple flights performing the same procedure), which imposes concerns in data link congestion as the service expands (e.g., as weather data is uplinked to more and more individual flights). One possible solution is to enhance D-ATIS to broadcast Flight Management System (FMS) climb and descent weather forecast data. For example, weather data may be broadcasted every minute or so (plus a valid time of the forecast data), the climb and descent forecast may be developed for specific arrival/departure gates and/or procedures, and/or the uplink weather could be calculated and may include information from previously downlinked aircraft meteorological reports. But using D-ATIS may raise concerns about competition and other legislative issues.

BRIEF DESCRIPTION

In one embodiment, a method for providing one or more aircraft with weather data during flight includes generating a weather model using a source of weather data. The weather model incorporates flight operations information and performance requirements. The method includes generating a weather message from the weather model. The weather message is generated in a format that is compatible with the aircraft. The method also includes transmitting the weather message to the aircraft during flight of the aircraft.

In another embodiment, a method is provided for managing subscription to a weather service that provides aircraft with weather data during flight. The method includes receiving subscription requests that request subscription to the weather service, recording in a subscription database valid subscriptions to the weather service that are based on the subscription requests, and receiving a weather service request for an aircraft. The weather service request requests weather data from the weather service during flight of the aircraft. The method also includes verifying a subscription status of the aircraft by comparing the weather service request with the valid subscriptions in the subscription database, and providing or rejecting the weather service according to the subscription status of the aircraft.

In another embodiment, a weather service system provides one or more aircraft with weather data during flight. The weather service system includes an in-flight weather server (IFWS) having an operations specification (OS) module, an airspace objective specification (AOS) module, and a weather processing (WP) module. The WP module is operatively connected to the OS module and the AOS module. The WP module is configured to generate a weather model using a source of weather data, flight operations information received from the OS module, and performance requirements received from the AOS module. The weather service system also includes a weather message generator server (WMGS) operatively connected to the IFWS. The WMGS is configured to receive the weather model from the IFWS and generate a weather message from the weather model. The WMGS is configured to generate the weather message in a format that is compatible with the aircraft. The WMGS is further configured to transmit the weather message to the aircraft during flight of the aircraft.

DETAILED DESCRIPTION

Figure 1A:
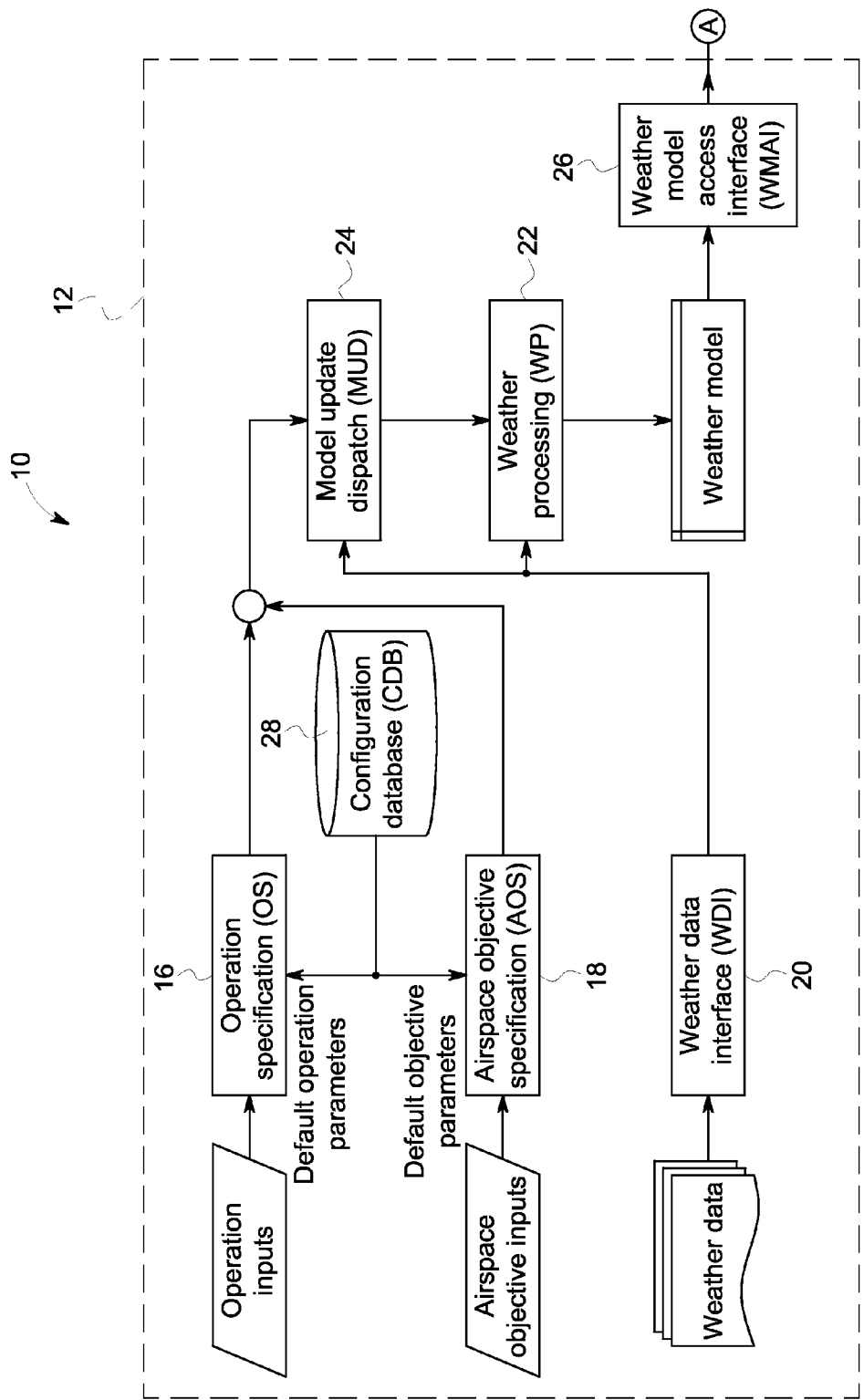
FIG. 1 is schematic block diagram of an exemplary embodiment of a weather service system.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. As used herein, the meaning of an "update" is intended to include a "recreation" and a "regeneration".

Described herein are various embodiments for a subscription in-flight weather service that provides one or more aircraft with weather data during flight of the aircraft. The weather service can be addressed to specific individual flights and/or can be broadcasted (e.g., sharing communication channels), but only subscribers can decode the weather data. Data format with specific parameters for a limited set of Flight Management System (FMS) configurations can be used to formulate data for automatic uploading into the FMS. Alternatively, a generic data format can be provided to allow the pilot or FMS to select what to upload. The weather service could use a separate radio frequency different from the frequencies used by Datalink Automatic Terminal Information Service (D-ATIS) or Aircraft Communications Addressing and Reporting System (ACARS). If a separate radio frequency is used, the range of the radio might be a concern, for example, for arrivals, the weather needs to be loaded in the aircraft FMS prior to top of descent, which may require a range of at least 150 nm from the destination airport. Another option is to use an air-ground data link specified by current or future standards, for example using pre-defined and/or user configurable messages. Another option is to use airborne internet via an internet connection of the aircraft.

Various embodiments provide methods and systems for providing one or more aircraft with weather data during flight. Various embodiments, provide methods and systems for managing subscription to a weather service that provides aircraft with weather data during flight. Technical effects of various embodiments may include generating weather models and messages taking into account operator preferences and air traffic control (ATC) objectives, consistent weather data across flights from different operators to allow for the consistent operation for efficiency, and/or leveraging air-ground data link communications including ACARS, direct radio frequency (RF) data link, and airborne internet access. Technical effects of various embodiments may include broadcast of extended weather data to multiple flights in an airspace, weather data that is tailored to the performance requirements for the specific operation so that extraneous data is not transmitted, and/or efficient use of computational and communicational resources through systematically developed system architecture. Further, technical effects of various embodiments may include providing business growth opportunities by offering systems support Next Generation Air Transportation Systems (NextGen), providing business growth opportunities by offering in flight weather services as an ATC approved independent service provider with technologies that place the business in an advantage position, and/or different installation and operation configurations to satisfy weather service needs of customers with different levels of capacities and different operations (which may consequently increase direct revenue). Moreover, technical effects of various embodiments may include integration with other in-house Air Traffic Management (ATM) systems and services to enhance market leverage, and/or enabling other "add-on" services that require relatively accurate and tailored weather data.

As used herein, the term "aircraft" may include any type of flying apparatus having any design, structure, configuration, arrangement, and/or the like. For example, an aircraft may be a fixed wing airplane. But, the various embodiments of systems and methods described and/or illustrated herein are not limited to airplanes or fixed wing aircraft. Rather, the various embodiments of systems and methods may be implemented within other types of aircraft having any other design, structure, configuration, arrangement, and/or the like, such as, but not limited to, aerostats, powered lift aircraft, and/or rotorcraft, among others. Moreover, the various embodiments are not limited to being used with aircraft. Rather, the various embodiments may be used for other applications, such as, but not limited to, operations of maritime vessels, operations of land-based vehicles, operations of solar and/or wind power farms, and/or the like.

Figure 1B:
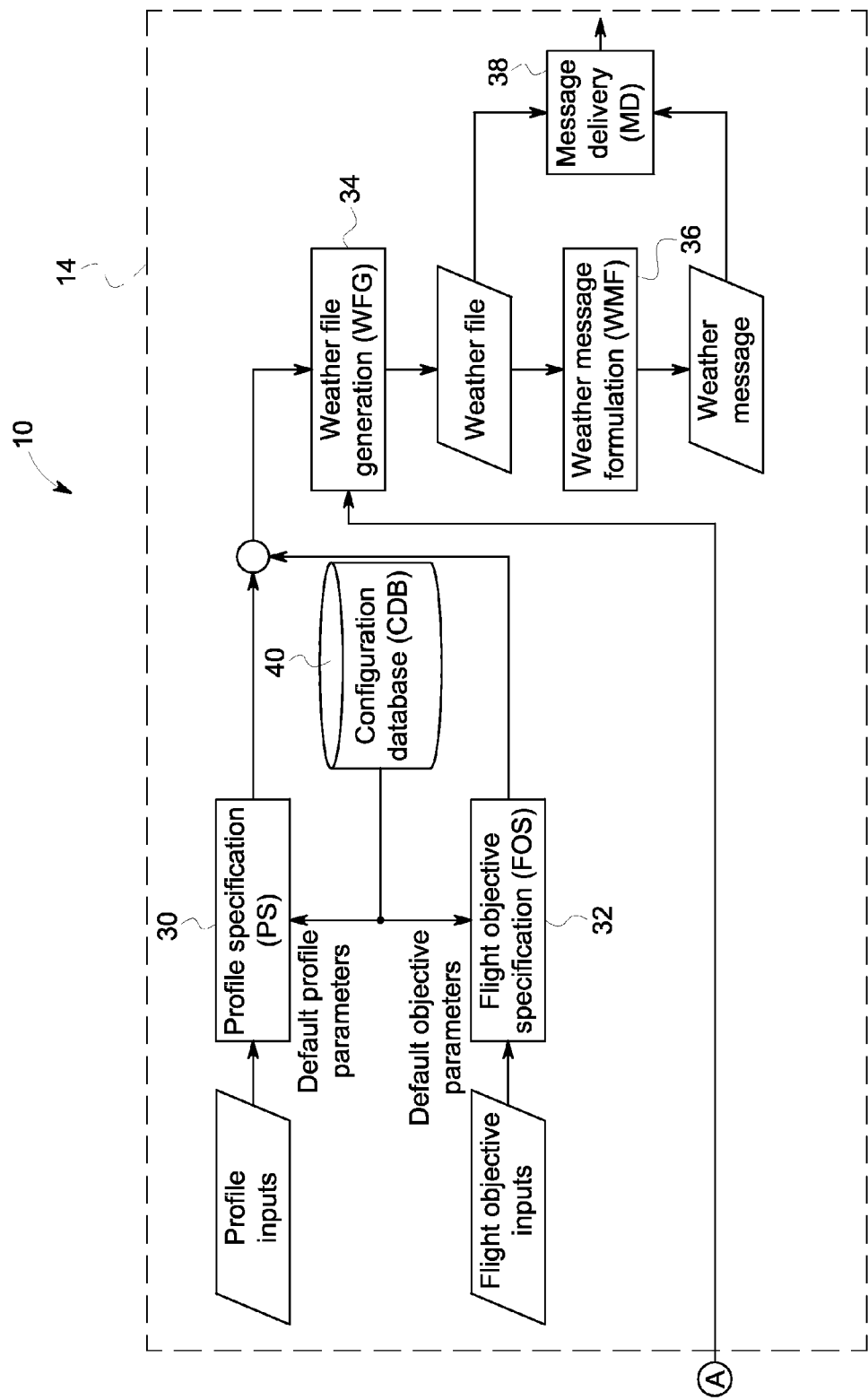

FIG. 1 is block diagram of a weather service system 10 formed in accordance with various embodiments. The weather service system 10 provides one or more aircraft with weather data during flight of the aircraft. The weather service system 10 includes an in-flight weather server (IFWS) 12 and a weather message generator server (WMGS) 14 that is operatively connected to the IFWS 12. As will be described in more detail below, the IFWS 12 generates weather models using one or more sources of weather data. The WMGS 14 receives weather models from the IFWS 12 and generates weather messages from the weather models. The weather messages generated by the WMGS 14 are transmitted, for example by the WMGS 14, to aircraft during flight of the aircraft.

The IFWS 12 is configured to generate one or more weather models from one or more various available weather data sources. The IFWS 12 maintains and provides access interfaces to the generated weather models for use by the WMGS 14. One exemplary purpose of the IFWS 12 is to fuse and deduce a subset of available weather data that can be conveniently and efficiently accessed by the WMGS 14 for a plurality of flights that share similar flight operations.

An exemplary embodiment of the IFWS 12 is shown in FIG. 1. The IFWS 12 may include a variety of modules, for example an operation specification (OS) module 16, an airspace objective specification (AOS) module 18, a weather data interface (WDI) module 20, a weather processing (WP) module 22, a model update dispatch (MUD) module 24, and/or a weather model access interface (WMAI) module 26. In the exemplary embodiment of FIG. 1, the IFWS 12 also includes a configuration database (CDB) 28.

Referring first to the OS module 16, the OS module 16 is configured to manage information related to the type of flight operations that are supported by the weather service (i.e., for which the weather data will be provided). The flight operations information may include, but is not limited to, specifying airspace in which the flight operations are conducted (i.e., in which the aircraft is/are intended to fly), the configuration of the airspace, the types of flight procedures, and/or the like. For terminal area operations, the airspace may extend from a central airport (there may be other airports nearby the central airport) to the boundary of the terminal airspace that is a predetermined distance (such as, but not limited to, at least approximately 20 nautical miles, at least approximately 40 nautical miles, and/or the like) from the central airport. Alternatively, for terminal area operations, the airspace may extend to en route airspace that is a predetermined distance (such as, but not limited to, between approximately 99 and 201 nautical miles) from the central airport. For en route operations, the airspace may cover one or more sectors and/or certain flight levels (e.g., altitudes), the entire airspace controlled by an ATC entity (i.e., an ATC facility), or a volume of airspace consisting of sectors from adjacent ATC entities. The configuration of the airspace defines the assignment of airspace sectors to different flight operations.

The flight operations information managed by the OS module 16 may include specifying one or more types of flight procedures within the airspace that are supported by the weather service. The flight procedures may include, but are not limited to, arrivals, departures, over flights, flights conducted by jet aircraft or propeller aircraft, flights to and from specified terminal airspace entry or exit gates or fixes, major traffic flows in en route airspace, and/or the like. In general, the flight operations information managed by the OS module 16 determines the scope of the weather model (described below) that is generated by the IFWS 12.

The OS module 16 may include textural, graphical, voice, and/or other types of user interfaces to assist a user to interactively manage the flight operations information. In some embodiments, electronic interfaces may be included for receiving flight operations information from other systems hosted by an operator of the weather service system 10, from an ATC entity, and/or from an aircraft operator entity that controls operation of one or more aircraft. The OS module 16 may be operatively connected to the CDB 28 (described in more detail below) for receiving predefined default operation specification parameters and/or associated weather model parameters (described below). Operation specification parameters may be referred to herein as "operation parameters".

The AOS module 18 is configured to manage performance requirements related to the weather service and the flight operations that are supported by the weather service. The performance requirements may include, but are not limited to, Required Navigation Performance (RNP) for a flight or a flight procedure, traffic throughput in terms of flight flow rate, the use of performance based flight profiles (such as, but not limited to, Optimized Profile Descent (OPD), Optimized Profile Climb (OPC), and/or the like), flight profiles optimized to maximize traffic throughput, or a trade off therebetween, a vertical profile within certain limits from a nominal profile and operational objectives and parameters, high throughput operations, convective weather avoidance operations, and/or the like.

One example of flight profiles optimized to maximize traffic throughput is to desire different flights to follow a similar vertical profile, such that the in trail spacing between flights can be managed more easily and vertical separation between crossing traffic can be managed more efficiently. In such a case, the same wind forecast model with best fitting to the original forecast data can be used even if the model does not reflect the most accurate winds for some flights (e.g., due to the difference in time). In general FMSs will build a vertical path based on forecast winds, and try to follow the vertical path unless there is a problem with aircraft performance that will prevent following the vertical path.

The performance requirements can be translated into weather model requirements, such as, but not limited to, requirements on forecast age, grid resolution, grid intervals, accuracy, model update rate, and/or the like. (As will be described below, the translation of performance requirements into weather model requirements is performed by the WP module 22.) When the translation is completed, the weather model to be generated attempts to satisfy the most stringent requirements defined by the OS module 16 and the AOS module 18, as opposed to satisfying the minimum requirements (which may be the case of many known systems). Accordingly, the data provided by the weather model can then be tailored to meet various levels of needs from a broad fleet of aircraft operating in the airspace.

Performance requirements related to the weather service may also be explicitly specified to define weather model configuration parameters. In some embodiments, a specific weather forecast product with validated performance may also be specified. A weather product performance category scheme may also be developed and used across organizations and/or as industry standards. The AOS module 18 may include textural, graphical, voice, and/or other types of user interfaces to assist a user to interactively manage the performance requirements. In some embodiments, the AOS module 18 includes electronic interfaces for receiving performance requirements from other systems hosted by an operator of the weather service system 10, from an ATC entity, and/or from an aircraft operator entity that controls operation of one or more aircraft.

The AOS module 18 may provide a means to consider the needs of the Air Navigation Service Provider (ANSP) in the weather service provided by the weather service system 10. For example, if spacing management is critical, the same weather data can be provided to a group of in trail flights so that the same airspeed may be assigned to the flights, which may provide predicted spacing that is consistent between different flights and therefore may simplify the traffic control task.

The AOS module 18 may be operatively connected to the CDB 28 (described in more detail below) for receiving predefined default airspace objective specification parameters and/or associated weather model parameters (described below). Although shown as being separate and discrete modules, alternatively, the OS module 16 and the AOS module 18 may be combined into a single module. Airspace objective specification parameters may be referred to herein as "airspace objective parameters" and/or more simply as "objective parameters".

The CDB 28 is operatively connected to the OS module 16 and the AOS module 18. The CDB 28 manages predefined operational configurations for the IFWS 12, which are defined by combinations of operation specification parameters and airspace objective specification parameters. The CDB 28 provides default configuration parameters for the OS module 16 and the AOS module 18. Information managed by the CDB 28 may also relates operation specification parameters and airspace objective specification parameters to weather model parameters, such as, but not limited to, types of weather data to be contained in the weather model, three-dimensional (3D) airspace scope, weather prediction horizon, horizontal and vertical model resolution (e.g., grid and grid intervals), temporal resolution (e.g., time grid and time intervals), model update criteria, model update rates, and/or the like. Information managed by the CDB 28 may include, but is not limited to, scheduled time to switch from one configuration to another. Such a configuration switch reflects changes in operational requirements and objectives as scheduled traffic volume changes over time.

In some embodiments, the CDB 28 may include textural, graphical, voice, and/or other types of user interfaces to assist a user (e.g., a configuration database manager) to interactively create new entries to the CDB 28, update existing entries in the CDB 28, and/or to assist operators of the weather service system 10 to define inputs to the system 10 by providing default inputs, selective options, and/or the like. The CDB 28 may include electronic interfaces for receiving information necessary to update and/or maintain the CDB 28 from other systems hosted by an operator of the weather service system 10, from an ATC entity, and/or from an aircraft operator entity that controls operation of one or more aircraft. The CDB 28 and associated database files may be built as a separate system that is connected to the IFWS 12, or the CDB 28 and associated database files may be integrated into the IFWS 12 as a single system.

Referring now to the WDI module 20, the WDI module 20 is operatively connected to one or more internal and/or external sources (e.g., the source 110 shown in FIGS. 2-6) of weather data for receiving weather data therefrom. The WDI module 20 provides functionality for the IFWS 12 to access the weather data source(s). Weather data may be accessed remotely from the weather data sources as needed (e.g., on-demand), and/or may be obtained and stored in a local system cache of the IFWS 12, for example. Cached data in the IFWS 12 can be easily moved to local archive for analysis, tracking, and/or improving system performance. For nationwide forecast weather grids from sophisticated super computer systems, use of data stored in local cache may reduce network communication burdens and/or increase access speed. The terms "source of weather data" and "weather data source" are used interchangeably herein.

The external and/or internal sources of weather data may include, but are not limited to, systems operated by international weather data providers, systems operated by national weather data providers, systems operated by commercial weather data providers, and/or the like. The weather data may include, but is not limited to, observed and/or predicted weather data from different systems operated by different organizations, achieved and processed historical data, raw weather data, processed weather data, observed weather data, forecast weather data, and/or the like. In some embodiments, a four-dimensional (4D) Weather Single Authoritative Source may be used as a primary source of weather data.

The WDI module 20 may include one or more tools for managing and expanding the support of new data sources that may be available, such as, but not limited to, new textual, binary, Extensible Markup Language (XML), and/or other data formats. The tools may enable the WDI module 20 to support new data sources with minimal or no changes in software code. For example, standard data formats currently being used and/or envisioned may be identified and such formats may be defined by parameters. Accessing of weather data sources, be it remotely and/or from local cached data, may be limited to the airspace region of interest, for example to improve processing speed and/or reduce data access latency and retrieval volume. For example, more than one IFWS 12 may be provided to support different operations within the same region or adjacent regions.

The MUD module 24 is operatively connected to each of the OS module 16, the AOS module 18, and the WDI module 20. The MUD module 24 monitors inputs from the OS module 16 and the AOS module 18 and monitors the status of weather data sources to determine when to generate one or more weather models (i.e., whether or not one or more weather models needs to be generated).

As used herein, "generating" one or more weather models may mean creating one or more new weather models and/or updating one or more existing weather models. One example of an event that triggers the update of an existing weather model is when the operation is switched to a new configuration, which may include both the content and parameters of the weather model(s) being updated. Another example includes updating a weather model or weather models whenever a new release of a weather data item is available from a weather data source. But, if the impact of the new release is not operationally significantly different (e.g., because the changes in the data is relatively small and/or because the data item is less relevant to the current configuration, as indicated by the weather performance requirements), then the weather model(s) may not be updated, for example to avoid the update being propagated throughout the system 10 with relatively minimal benefits in return.

Moreover, in some circumstances, the airspace objective may require that the weather model(s) remain stable for a period of time even if certain weather conditions (e.g., a change in winds) have changed. The airspace objective may require the vertical profile of a sequence of arrival flights to remain consistent. A similar example would be requiring a Single Authoritative Source to be used even if a more accurate weather model is available (e.g., commonality with the ANSP may be more important than direct efficiency for certain operations). By using the same forecast winds, the FMS will generate similar profiles that satisfy airspace constraints while changes in winds may be compensated by autopilot and autothrottle and/or by pilot manual control inputs as long as the changes in winds are within certain bounds. In some circumstances, the benefits in traffic throughput might well offset the extra fuel cost due to discrepancies between the forecast winds and actual winds.

Referring now to the WP module 22, the WP module 22 is operatively connected to each of the WDI module 20 and the MUD module 24. Upon activation by the MUD module 24, the WP module 22 integrates specified inputs from the OS module 16 and the AOS module 18 to determine one or more sets of weather performance requirements. The specified inputs from the OS module 16 and the AOS module 18 that are integrated may include, but are not limited to, the flight operations information and the performance requirements managed by the OS module 16 and the AOS module 18, respectively. Examples of the weather performance requirements include, but are not limited to, the airspace region of interest, 3D airspace scope, forecast time horizon, horizontal and altitude resolution and time step, required weather data contents to be included in the weather model or models, specific weather model data structure, types and/or number of weather models to be generated to satisfy operation needs, and/or the like. The weather performance requirements determined by the WP module 22 may also be referred to as "weather model specifications".

The WP module 22 also receives weather data from one or more of the weather data sources via the WDI module 20. The WP module 22 generates one or more weather models according to the weather data and the weather performance requirements. In other words, the WP module 22 formulates the deduced weather data into one or more weather models that satisfy the weather performance requirements. In some embodiments, the processing of weather data from various weather data sources yields a subset or subsets of unified and consistent weather data necessary to support the operations in question.

Each weather model is configured to provide a subset of weather data that can be conveniently and efficiently accessed by the weather service system 10. In some embodiments, a weather model is relatively compact, for example providing only data relevant to the operations in question and for the region of interest, such that repetitive fast query can be supported. Examples of the form of a weather model include, but are not limited to, a four dimensional (4D) grid. The 4D grid may or may not include equal number of grids for all instantiations of any dimension. For example, the different horizontal grids may be used at different altitudes and/or at different forecast times. The 4D grid may include a two-dimensional (2D) horizontal grid in terms of latitude and longitude or a plane grid based on a flat earth approximation or map projection. The horizontal grid is then stacked vertically, by pressure levels, pressure altitudes, and/or geometric altitudes to form a 3D grid. The 3D grid is then spaced at different time steps up to the model forecast time horizon to form a 4D grid. For space launch vehicle applications, an earth centric 3D grid may be used. To be relatively compact and for relatively easy access, the four dimensions of the 4D grid may be reorganized from the nominal structure described above. For example, a 3D grid may present a 4D weather field by correlating the time of the surface 2D horizontal grid to a predicted vehicle launch time, and the time of a subsequent 2D horizontal grid at an altitude to the predicted time when the vehicle reaches that altitude. Additional 3D grids of same structure may be included in the weather model to provide weather data for different predicted launch times.

The same method of correlating time and space based on vehicle movement can be used to compress a 4D weather grid into a single 3D grid which is valid for a given period of time during which the discrepancy between forecast weather and actual weather is estimated to be acceptable. Known optimization algorithms may be employed to derive the 3D grid with minimum error. In some embodiments, a method for choosing the best en route and descent winds from a larger grid to uplink to the FMS is employed to further compress a 4D weather grid into a one-dimensional (1D) vector with minimum errors. For terminal area operations, a 1D vector representing winds aloft at various altitudes is referred to as a sounding. For ground transportation, a similar 1D vector may be used to represent weather data along the planned route instead of giving time of day forecasts at various cities. For certain applications, the raster data may be converted to vector data, such as, but not limited to, polygons, polyhedrons, and/or the like.

To retain weather model accuracy while using relatively compact and simplified data structures, a separate weather model can be generated for a group of flights arriving from, or departure to, a general direction. In such an embodiment, several weather models may be needed to cover all operations in the terminal area in question. Aside from dimension reduction, the size of the grid may be reduced without reducing the dimension by further limiting the airspace and/or temporal scope to the extent just sufficient enough to cover the movement of the aircraft, plus buffer to account for potential variations in operations. In addition to subdividing traffic flow and providing weather models for different flows, different weather models may be provided for different levels of dimension reduction or resolution. If relatively high speed processing is required, equal spacing grid may be used so that lookup date points may be directly mapped to grid indices extract model values rather than searching algorithms which has a complexity with a lower bound.

The WMAI module 26 is operatively connected to the WP module 22 for receiving weather models from the WP module 22. The WMAI module 26 establishes and maintains a weather model storage. The WMAI module 26 provides an interface for controlled access to the weather models by aircraft, ATC entities, and/or aircraft operator entities that control operation of one or more of the aircraft. The WMAI module 26 indexes the weather models generated by the WP module 22 for querying available weather models. Each weather model may include meta data that specifies various properties of the weather model and information needed to interpret the data contained within the weather model. Through the WMAI module 26, the WMGS 14 and users (e.g., aircraft, ATC entities, and/or aircraft operator entities that control operation of one or more of the aircraft) of the weather service may be isolated from the original weather data sources (which may use a format that is relatively difficult to access and/or interpret by the users). The isolation provided by the WMAI module 26 may facilitate reducing system development and/or maintenance cost, and/or may facilitate maintaining a relatively high system availability and/or reliability.

Referring now to the WMGS 14, the WMGS 14 is configured to generate and delivers weather messages from weather models generated and maintained by the IFWS 12. One exemplary purpose of the WMGS 14 is to generate a subset of weather data maintained by the weather model in a format that can be transmitted to the aircraft and can be automatically uploaded into airborne automation systems (such as, but not limited to, a FMS and/or the like) and/or can be automatically displayed in a meaningful way to the aircrew of an aircraft.

An exemplary embodiment of the WMGS 14 is shown in FIG. 1. The WMGS 14 may include a variety of modules. For example, the WMGS 14 may include a profile specification (PS) module 30, a flight objective specification (FOS) module 32, a weather file generation (WFG) module 34, a weather message formulation (WMF) module 36, and/or a message delivery (MD) module 38. In the exemplary embodiment of FIG. 1, the WMGS 14 also includes a configuration database (CDB) 40.

Referring first to the PS module 30, the PS module 30 is configured to manage profile specification information related to the flight operations specific to a flight or a plurality of flights. The profile specification information managed by the PS module 30 may include, but is not limited to, a planned route, a flight operational procedure, a flight profile, a planned speed and/or altitude profile, a previously predicted speed and/or altitude profile, a nominal speed and/or altitude profile, and/or the like. As an example, the FMS predicted aircraft trajectory may be downlinked to the PS module 30 as profile specification information.

While the OS module 16 of the IFWS 12 concerns all flights and airspace in the entirety within a region (e.g., the terminal area for a metropolitan area), the PS module 30 of the WMGS 14 concerns an individual flight or a group of flights that can be considered conducting the same flight operations (e.g., flying the same arrival procedure and/or flying through the same airspace corridor). The profile specification information may also include specifics about the target (airborne) automation system, for example the format of a weather model in the FMS of a target aircraft. The profile specification information determines the scope of a weather file (described below) that is generated by the WFG module 34, for example the number of winds that can be accepted at each waypoint. The profile specification information also determines the format of the weather messages generated by the WMFS 14.

The PS module 30 may include textural, graphical, voice, and/or other types of user interfaces to assist a user to interactively managing profile specification information. In some embodiments, electronic interfaces may be included for receiving information from one or more aircraft, from other systems hosted by an operator of the weather service system 10, from an ATC entity, and/or from an aircraft operator entity that controls operation of one or more aircraft. The PS module 30 may be operatively connected to the CDB 40 (described in more detail below) for receiving predefined default profile specification parameters and/or associated weather file and/or weather message configuration parameters (described below). Profile specification parameters may be referred to herein as "flight profile parameters" and/or more simply as "profile parameters".

The FOS module 32 is configured to manage objective specification information for the flight(s) in question, such as, but not limited to, performance requirements and operational objectives and parameters. The FOS module 32 of the WMGS 14 is similar to the AOS module 18 of the IFWS 12, however, the FOS module 32 focuses on objective specification information specific to the flight(s) in question. For example, the terminal operations normally involve a mixed fleet of aerial vehicles with different levels of technical performance and equipage. Specifying performance requirements for an individual flight or a selected group of flights allows the weather messages generated by the WMGS 14 to better match the needs of better equipped vehicles with higher control accuracy while also supporting vehicles equipped with legacy system and/or limited capability. In some embodiments, the objective specification information managed by the FOS module 32 includes a weighting of time vs. fuel cost, a deadband for controlling speed on an idle descent path, and/or the like, for example such that a tradeoff between accuracy for individual flights and consistency across a group of flights is incorporated into a generated weather message.

In some embodiments, the FOS module 32 may include textural, graphical, voice, and/or other types of user interfaces to assist a user to interactively manage the objective specification information managed by the FOS module 32. The FOS module 32 may include electronic interfaces for receiving objective specification information from one or more aircraft, from other systems hosted by an operator of the weather service system 10, from an ATC entity, and/or from an aircraft operator entity that controls operation of one or more aircraft. The FOS module 32 may be operatively connected to the CDB 40 for receiving predefined default flight objective specification parameters and associated weather file and/or weather message configuration parameters (described below). Flight objective specification parameters may be referred to herein as "flight objective parameters" and/or more simply as "objective parameters".

The CDB 40 is operatively connected to the PS module 30 and the FOS module 32. The CDB 40 manages predefined profile configurations for the WMGS 14, which are defined by combinations of profile specification parameters and flight objective specification parameters. The CDB 40 provides default configuration parameters for the PS module 30 and the FOS module 32. The CDB 40 also maintains a database of various aircraft system configurations, which for example may describe details of weather message formats corresponding to the aircraft system configurations. An aircraft system configuration identification (ID) may be used to reference to a particular configuration so that weather message formatting details do not have to be transmitted when a weather message request is sent to an operator of the weather service system 10. The weather message configuration parameters may be a function of, for example, the phases of flight (as is the case for most commercial aircraft today). The CDB 40 may also link specific aircraft tail numbers with the corresponding configuration parameters thereof such that the configuration parameters can be easily looked up when the weather message request is processed. As an aerial vehicle going through equipment upgrades, its configuration parameter may also change. When a configuration parameter changes, the configuration can be easily updated through a service subscription management channel.

The CDB 40 may include textural, graphical, voice, and/or other types of user interfaces to assist a user (e.g., a configuration database manager) to interactively create new entries to the CDB 40, update existing entries in the CDB 40, and/or to assist operators of the weather service system 10 to define inputs to the system 10 by providing default inputs, selective options, and/or the like. The CDB 40 may include electronic interfaces for receiving information necessary to update and/or maintain the CDB 40 from other systems hosted by an operator of the weather service system 10, from an ATC entity, and/or from an aircraft operator entity that controls operation of one or more aircraft.

The CDB 40 and associated database files may be built as a separate system that is connected to the WMGS 14, or the CDB 40 and associated database files may be integrated into the WMGS 14 as a single system. In the exemplary embodiment of FIG. 1, the CDB 40 is a separate and discrete component from the CDB 28 of the IFWS 12. Alternatively, the CDB 40 and the CDB 28 are combined into a single component.

The WFG module 34 is operatively connected to each of the PS module 30 and the FOS module 32. The WFG module 34 is also operatively connected to the WMAI module 26 of the IFWS 12. The WFG module 34 integrates inputs from the PS module 30 and the FOS module 32. The WFG module 34 receives weather models generated by the IFWS 12 through the WMAI module 26 of the IFWS 12. The WFG module 34 uses the inputs from the modules 30 and 32 and one or more weather models received from the IFWS 12 to generate an intermediate weather file. In other words, the WFG module 34 is configured to integrate specified inputs from the PS module 30 and the FOS module 32, to access the proper (i.e., corresponding) weather model(s) generated by the IFWS 12, and to generate a weather file. The intermediate weather file may also be referred to herein more simply as a "weather file".

As used herein, "generating" one or more intermediate weather files may mean creating one or more new weather files and/or updating one or more existing weather files. In some embodiments, the WFG module 34 generates an intermediate weather file by reducing the corresponding weather model(s) to a subset of weather data that satisfies the needs of requested weather messages for the aircraft but that is not yet formulated in the specific format for the target system. Dimension reduction methods may be further applied to reduce the dimension of the weather model to that required by the weather message before the intermediate weather file is generated.

The intermediate weather file separates the specific weather message encoding details from the general requirements for a weather information request. For example, an aircraft FMS may require the descent winds aloft be represented as wind direction and speeds as functions of altitude in general. The specific message encoding however, may require only a maximum of 4 data points be provided, wind direction be in integer degrees, and wind speed in integer knots, for example. The intermediate weather file can be generated by reducing the dimension from that of a potential 4D grid used by the weather model to a 1D vector of wind direction and speeds versus altitude, and retaining the native data resolution, precision, and units of the weather model without considering which data points to pick for the weather message. When specific message encoding details change as a result of vehicle system upgrade, the functionality of the WFG module 34 remains the same, and only the weather message formulation (described below with respect to the WMF module 36) needs to be adjusted to accommodate that change.

The intermediate weather file may ease weather message formulation. For example, the selection of optimal data points to be used in the weather message can be achieved through analyzing the much simpler weather file rather than the weather model, which has been generated to support a host of flights. A weather file normally contains more details than a weather message for a specific vehicle. Accordingly, intermediate weather files may be well suited for display to various persons involved in the flight operations. The data points in the weather message can be overlaid on the intermediate weather file to illustrate how well the weather message captures key information in the intermediate weather file. The intermediate weather file can also be used in what-if scenarios to simulate aircraft behavior by providing both the weather message to the vehicle systems and the weather file to the simulator to emulate detailed actual weather. Accordingly, while the weather message is transmitted to the aircraft, the intermediate weather file may be transmitted to an ATC entity and/or to an aircraft operator entity that controls operation of one or more aircraft.

Referring now to the WMF module 36, the WMF module 36 is operatively connected to the WFG module 34 for receiving intermediate weather files therefrom. The WMF module 36 generates weather messages. Specifically, the WMF module 36 uses one or more intermediate weather files received from the WFG module 34 to formulate one or more weather messages according to specific weather message encoding rules for the flight(s). The WMF module 36 then prepares the weather message for transmission to one or more aircraft. As used herein, "generating" one or more weather messages may mean creating one or more new weather messages and/or updating one or more existing weather messages.

The weather messages generated by the WMF module 36 are generated in a format that is compatible with the aircraft to which the weather messages are sent. By "compatible with the aircraft, it is meant that a weather message is capable of being transmitted to the aircraft, is capable of being received by the aircraft, and is capable of being accessed and interpreted by an automated system of the aircraft and/or a person (e.g., a member of the aircrew) on-board the aircraft. For example, a weather message may be formulated in a specific format that matches the format of the target system (i.e., the aircraft to which the weather message is being sent). Moreover, and for example, a weather message may be formulated in a format that can be automatically uploaded into an airborne automation system (such as, but not limited to, a FMS and/or the like) of an aircraft and/or can be automatically displayed in a meaningful way to the aircrew of an aircraft.

Examples of weather messages generated by the WMF module 36 include, but are not limited to, winds aloft, ambient temperature (which may or may not be given as deviations from the standard atmosphere temperature), humidity (which may be useful when engine emissions is considered by the airborne system in performance optimization), observed and/or predicted weather radar reflections of precipitation, and/or the like. Depending on the aircraft system design, a weather message may provide delineated data points, 1D vector references to altitudes, 1D vector references to waypoints, 1D vector references along track distances, 1D vector references to named waypoints, 1D vector references to computed waypoints, 1D vector references to latitude intervals, 1D vector references to longitude intervals, 2D horizontal grids (for the same altitudes), 2D vertical grids (altitude versus track distance, latitude, and/or longitude), 3D and/or 4D grids with the temporal dimension for more advanced systems, and/or the like. For example, an advanced multi-dimensional (up to 4D) grid representation of winds may be used to enable different proposed route and profile amendments be accurately evaluated by an FMS without changing the wind model for each proposed amendment. In such a grid, winds do not have to be tied to waypoints in the flight plan, but associated with regions defined using non-conventional grids (e.g., grids used in a magnetic variation models). In any case, the number of data points that can be accepted by the aircraft systems may be limited and may be less than the number of data points that can be provided by the weather model, which may be due to system performance limitations and communication bandwidth limitations. Specific operational considerations and optimization may be included in the process to down sample the data points from the weather file to minimize impacts that may be introduced due to the fact that only a limited number of data points can be accepted by the aircraft systems.

The MD module 38 is operatively connected to the WMF module 36 for receiving weather messages from the WMF module 36. The MD module 38 is configured to transmit one or more weather messages to one or more aircraft. The MD module 38 may be configured to transmit one or more weather messages to one or more ATC entities and/or to one or more aircraft operator entities that control operation of one or more aircraft. In some embodiments, the MD module 38 may be operatively connected to the WFG module 34 for receiving intermediate weather files from the WFG module 34. The MD module 38 may be configured to transmit one or more intermediate weather files to one or more aircraft, one or more ATC entities, and/or to one or more aircraft operator entities that control operation of one or more aircraft.

The MD module 38 may be configured to transmit weather messages and/or intermediate weather files to aircraft, ATC entities, and/or aircraft operator entities that control operation of one or more aircraft using any structure, means, type of communications network, type of communications infrastructure, and/or the like. For example, transmission of weather messages and/or inter mediate weather files to an aircraft may be achieved through ground based direct Radio Frequency (RF) communications, ground based RE network connections such as Very High Frequency (VHF) data links, satellite based network connections, airborne internet connections, and/or the like. Commercial communications such as ACARS may also be used, which may be enhanced to enable the capability to broadcast a single message to a plurality of aircraft. Moreover, and for example, transmission of weather messages and/or intermediate weather files to ATC entities and/or aircraft operator entities that control operation of one or more aircraft may be performed using ground-to-ground network connections, including internet and private direct links.

Referring again to the weather service system 10 generally, the weather service system 10 may be utilized with aircraft operations in a terminal area, may be utilized with aircraft operations at the airport surface, and/or may be utilized in en route airspace. The weather service system 10 may be embodied in (i.e., defined by) a single computer system or may be embodied in two or more networked computer systems. For example, the IFWS 12 and the WMGS 14 may be embodied together in a single computer system or the IFWS 12 may be embodied within a different computer system than the WMGS 14. Moreover, and for example, different components of the IFWS 12 may be embodied in different computer systems and/or different components of the WMGS 14 may be embodied in different computer systems, whether or not any components of the IFWS 12 are embodied in the same computer system as any components of the WMGS 14. In other words, the operations (i.e., functionalities) of each of the IFWS 12 and the WMGS 14 may be spread over two or more different computer systems, whether or not any of the different computer systems performs operations of both the IFWS 12 and the WMGS 14. The individual components may be virtualized and hosted by a cloud type computational environment, for example to allow for dynamic allocation of computational power, without requiring the user concerning the location, configuration, and/or specific hardware of the computer system.

The weather service system 10 may be implemented within an air traffic environment in any configuration that enables the weather service system 10 to function as described and/or illustrated herein. For example, the entire weather service system 10 (i.e., the IFWS 12 and the WMGS 14) may be installed at the facility of an existing or newly created weather service provider entity, may be installed at the facility of an ATC entity, or may be installed at the facility of an aircraft operator entity that controls operation of one or more aircraft. Moreover, and for example, different components (e.g., the IFWS 12, components of the IFWS 12, the WMGS 14, and/or components of the WMGS 14) of the weather service system 10 may be installed at the facilities of different entities (e.g., a weather service provider entity, an ATC entity, and/or an aircraft operator entity that controls operation of one or more aircraft). For example, the IFWS 12 may be installed at the facility of a different entity than the WMGS 14. Moreover, and for example, different components of the IFWS 12 may be installed at the facilities of different entities and/or different components of the WMGS 14 may be installed at the facilities of different entities, whether or not any components of the IFWS 12 are installed at the facility of the same entity as any components of the WMGS 14. In embodiments wherein different components of the weather service system 10 are installed at the facilities of different entities, each component of the weather service system 10 may be installed at the facility of any of the different entities. The term "install" may refer to a computer or a plurality of networked computers physically residing at a physical facility operated by an entity, and/or the term "install" may refer to the virtual hosting associated with the entity in charge of the facility where the actual computing may be performed in a cloud environment with physical computational machines located anywhere. The cloud may be a public cloud, a private cloud, and/or a hybrid cloud operated by the entity, a consortium with or without the entity being a member, and/or an independent third party.

Figure 2:
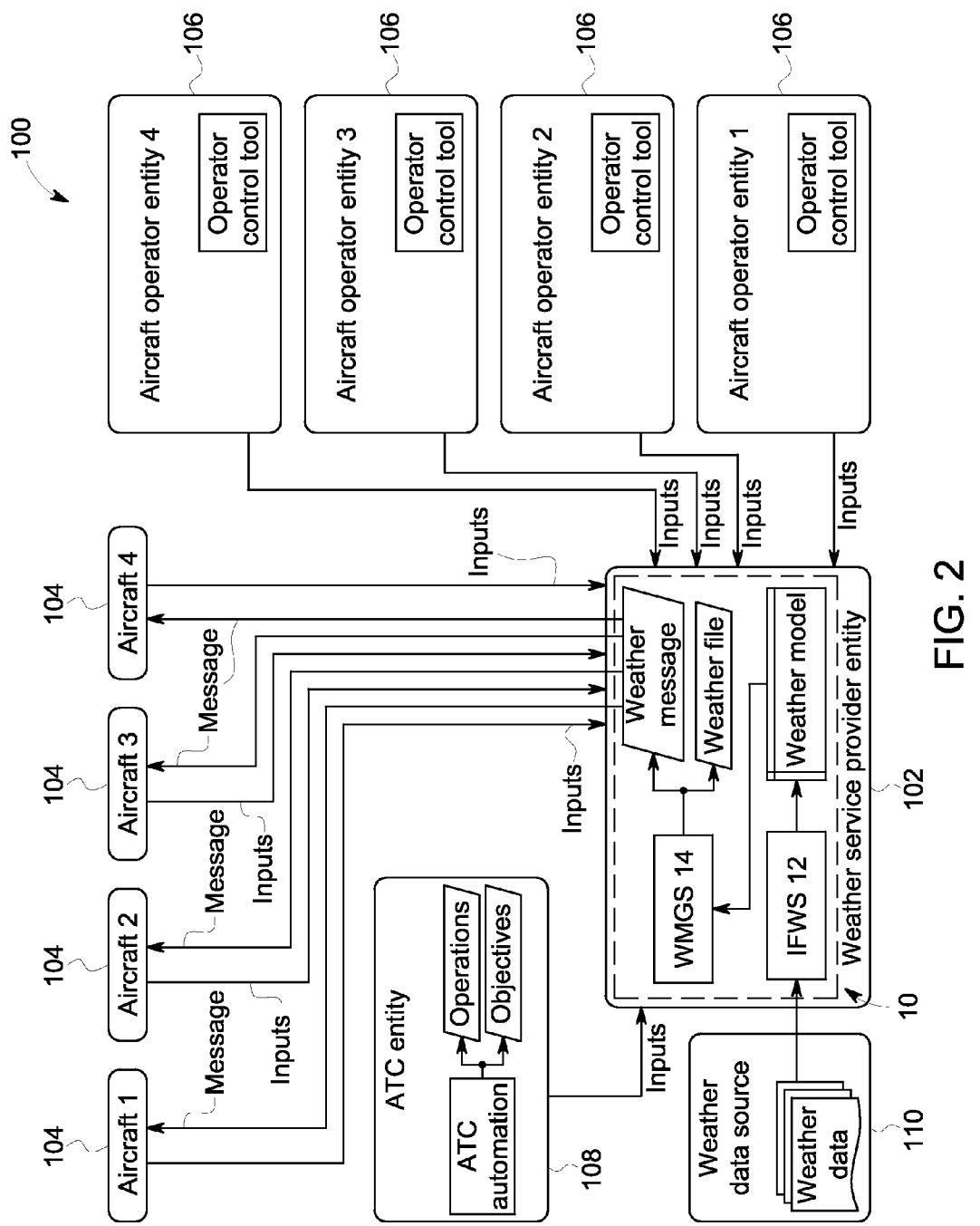
FIG. 2 is a schematic block diagram of an exemplary embodiment of an air traffic environment illustrating an exemplary implementation of the weather service system shown in FIG. 1.

FIG. 2 is a schematic block diagram of an exemplary embodiment of an air traffic environment 100 illustrating one exemplary implementation of the weather service system 10. In the exemplary embodiment of FIG. 2, the entire weather service system 10 is installed at the facility of a weather service provider entity 102. Both the IFWS 12 and the WMGS 14 are installed at the facility of, and are operated by, the weather service provider entity 102. The environment 100 includes the weather service provider entity 102, one or more aircraft 104, one or more aircraft operator entities 106 that each control operation of one or more of the aircraft 104, one or more ATC entities 108, and one or more weather data sources 110.

In the exemplary embodiment of FIG. 2, the environment 100 includes a single weather service provider entity 102, four aircraft 104, four aircraft operator entities 106, a single ATC entity 108, and a single weather data source 110. But, the environment 100 may include any number of the weather service provider entity 102, any number of the aircraft 104, any number of the aircraft operator entities 106, any number of the ATC entities 108, and any number of the weather data sources 110. For simplicity, each aircraft operator entity 106 is shown in the exemplary embodiment of FIG. 2 as controlling the operation of a single aircraft 104. But, each aircraft operator entity 106 may control the operation of any number of aircraft 104. In some embodiments, one or more of the aircraft operator entities 106 controls the operation of a relatively large number (e.g., greater than ten) of, and/or a relatively large variety (e.g., greater than three) of different, aircraft. Each weather data source 110 may be an internal source that is located at the facility of the weather service provider entity 102 or an external source that is located remotely from the facility of the weather service provider entity 102.

As described above, the weather service system 10, including the IFWS 12 and the WMGS 14, is operated by the weather service provider entity 102. The weather service system 10 receives inputs from one or more of the aircraft 104, one or more of the aircraft operator entities 106, and/or the ATC entity 108. The weather service system 10 generates weather models, weather files, and weather messages at the weather service provider entity 102. The weather service system 10 delivers (i.e., transmits) the weather messages to the aircraft 104. In some embodiments, the weather models and/or the weather files are delivered to the aircraft 104. In the exemplary embodiment of FIG. 2, the subscription to the weather service provided by the weather service system 10 is the delivery of weather messages to the aircraft 104. With additional subscription, access to the weather models, weather files, and/or copies of the weather messages delivered to the aircraft 104 may be provided to one or more of the aircraft operator entities 106. In some embodiments, the weather models, weather files, and/or weather messages are copied to the ATC entity 108.

In some embodiments, the weather service provider entity 102 is a sub-entity of the ATC entity 108. Moreover, in some alternative embodiments, the entire weather service system 10 (i.e., the IFWS 12 and the WMGS 14) is installed at the facility of the ATC entity 108 or at the facility of one or more of the aircraft operator entities 106.

Figure 3:
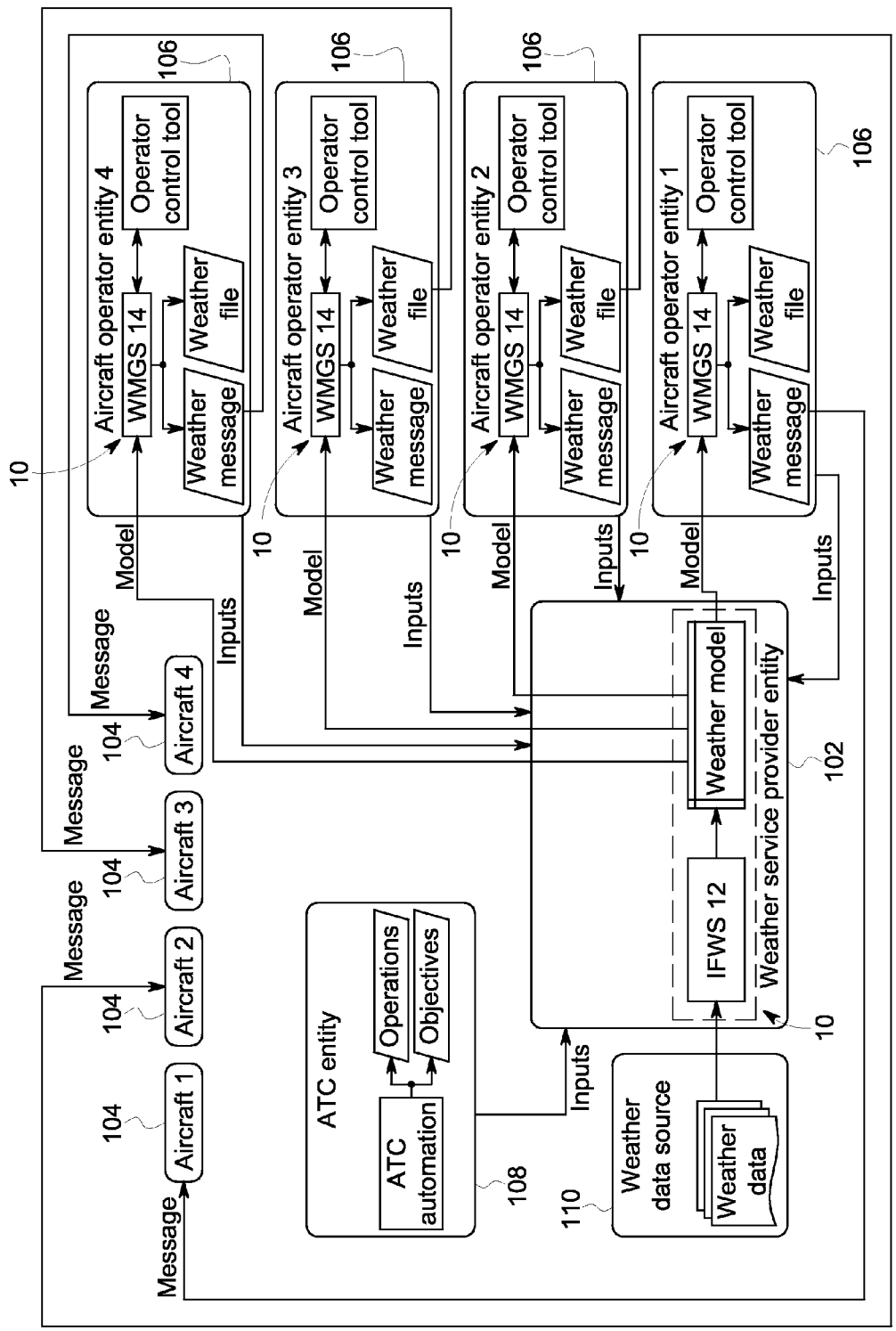
FIG. 3 is a schematic block diagram of another exemplary embodiment of an air traffic environment illustrating another exemplary implementation of the weather service system shown in FIG. 1.

FIG. 3 is a schematic block diagram of another exemplary embodiment of an air traffic environment 200 illustrating another exemplary implementation of the weather service system 10. In the exemplary embodiment of FIG. 3, the IFWS 12 of the weather service system 10 is installed at the facility of the weather service provider entity 102, while an WMGS 14 of the weather service system 10 is installed at the facility of each of the aircraft operator entities 106. In the implementation shown in FIG. 3, the IFWS 12 is operated by the weather service provider entity 102, and the WMGSs 14 are operated by the aircraft operator entities 106

The IFWS 12 operated by the weather service provide entity 102 receives inputs from one or more of the aircraft operator entities 106 and/or from the ATC entity 108. The IFWS 12 generates weather models at the weather service provider entity 102. The IFWS 12 delivers the weather models to the aircraft operator entities 106 and/or provides one or more of the aircraft operator entities 106 with controlled access to the weather models. In some embodiments, the weather models are copied to the ATC entity 108.

The aircraft operator entities 106 are responsible for generating the weather files and the weather messages and delivering the weather messages to the corresponding aircraft 104 that are controlled thereby. In some embodiments, an aircraft operator entity 106 delivers the weather models and/or the weather files to the corresponding aircraft 104 controlled thereby. In the exemplary embodiment of FIG. 3, the subscription to the weather service provided by the weather service system 10 is the delivery of weather models to the aircraft operator entities 106 and licensing and support of the WMGSs 14. Such a subscription may be suitable for aircraft operator entities 106 with a relatively large number of flights operating within the airspace controlled by the ATC entity 108. In some embodiments, one or more of the aircraft operator entities 106 delivers a copy of a weather file and/or a weather message to the ATC entity 108.

Figure 4:
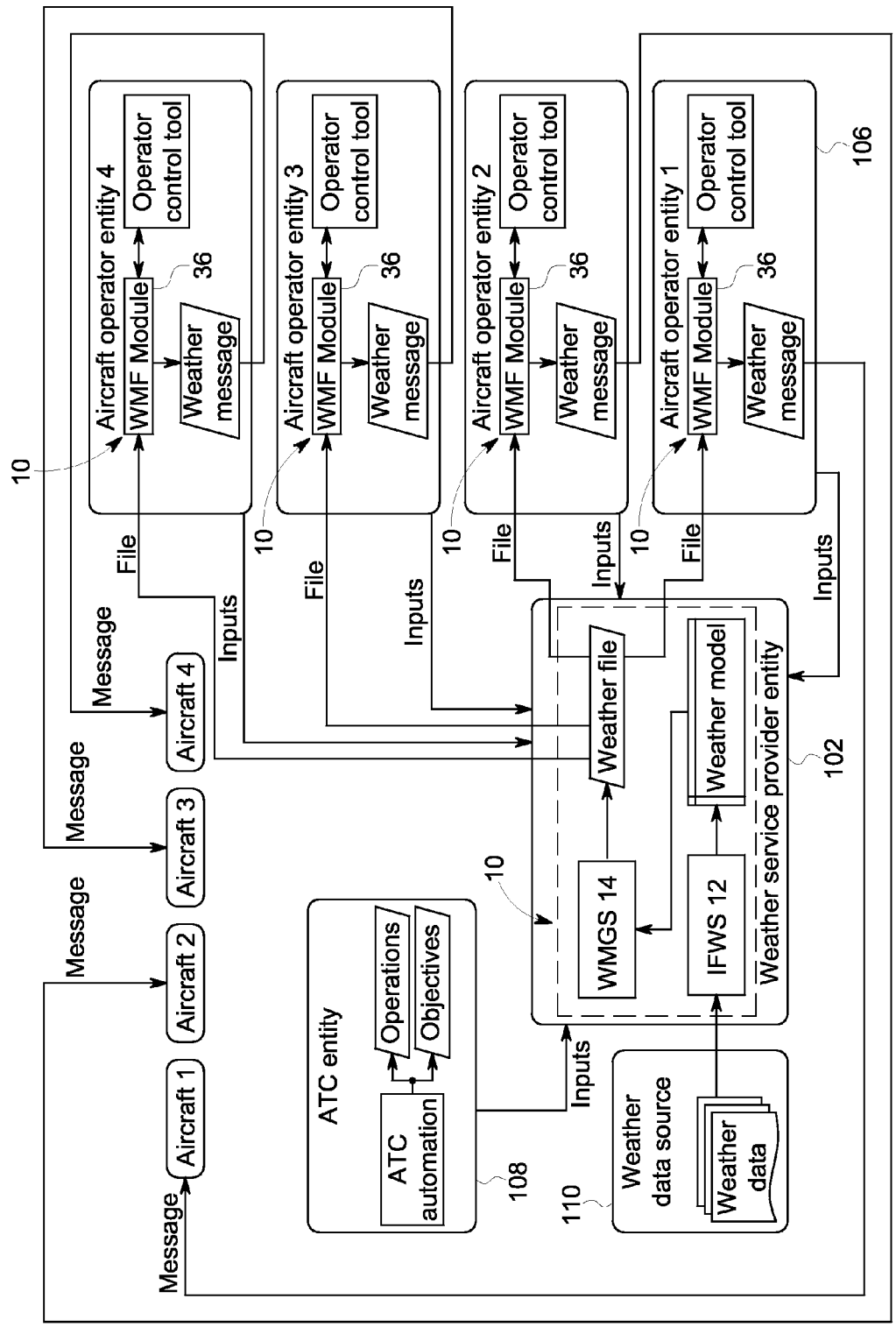
FIG. 4 is a schematic block diagram of another exemplary embodiment of an air traffic environment illustrating another exemplary implementation of the weather service system shown in FIG. 1.

FIG. 4 is a schematic block diagram of another exemplary embodiment of an air traffic environment 300 illustrating another exemplary implementation of the weather service system 10. In the exemplary embodiment of FIG. 4, the IFWS 12 of the weather service system 10 is installed at the facility of the weather service provider entity 102, while a WMF module 36 of the WMGS 14 is installed at the facility of each of the aircraft operator entities 106. The remainder (e.g., the modules 30, 32, 34, and 38 and the CDB 40, each of which is shown in FIG. 1) of the WMGS 14 of the weather service system 10 is installed at the facility of the weather service provider entity 102. One or more of the aircraft operator entities 106 may include an MD module 38 or similar module for delivering the weather messages to the corresponding aircraft 104 that are controlled thereby.

The IFWS 12 operated by the weather service provide entity 102 receives inputs from one or more of the aircraft operator entities 106 and/or from the ATC entity 108. The IFWS 12 generates weather models at the weather service provider entity 102. The WMGS 14 generates weather files at the weather service provider entity 102. The WMGS 14 delivers the weather files to the aircraft operator entities 106 and/or provides one or more of the aircraft operator entities 106 with controlled access to the weather files. In some embodiments, the weather models and/or weather files are copied to the ATC entity 108.

The aircraft operator entities 106 are responsible for generating the weather messages and the delivering the weather messages to the corresponding aircraft 104 that are controlled thereby. In some embodiments, an aircraft operator entity 106 delivers the weather models and/or the weather files to the corresponding aircraft 104 controlled thereby. In the exemplary embodiment of FIG. 4, the subscription to the weather service provided by the weather service system 10 is the delivery of weather files to the aircraft operator entities 106 and licensing and support of WMF module 36. Such a subscription may be suitable for aircraft operator entities 106 with multiple flights conducting the same procedure within the airspace controlled by the ATC entity 108. In some embodiments, one or more of the aircraft operator entities 106 delivers a copy of a weather message to the ATC entity 108.

Figure 5:
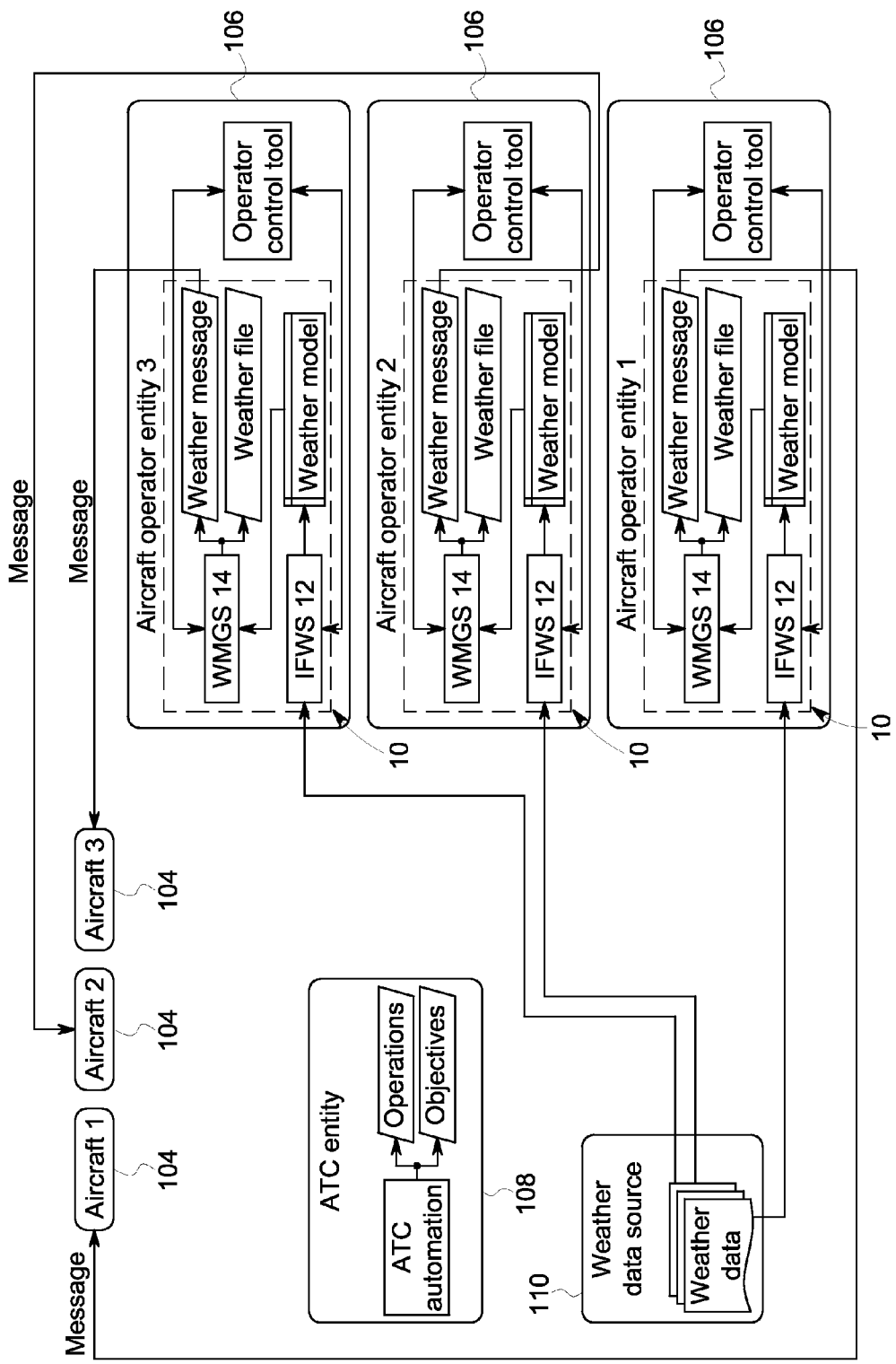
FIG. 5 is a schematic block diagram of another exemplary embodiment of an air traffic environment illustrating another exemplary implementation of the weather service system shown in FIG. 1.

FIG. 5 is a schematic block diagram of another exemplary embodiment of an air traffic environment 400 illustrating another exemplary implementation of the weather service system 10. In the exemplary embodiment of FIG. 5, an entire weather service system 10 is installed at the facility of each of the aircraft operator entities 106. Both the IFWS 12 and the WMGS 14 of the weather service system 10 are installed at the facility of, and are operated by, the aircraft operator entity 106.

Each weather service system 10, including the IFWS 12 and the WMGS 14, is operated by the corresponding aircraft operator entity 106. The weather service system 10 receives inputs from an operator control tool 112 of the corresponding aircraft operator entity 106 and/or from the ATC entity 108. The aircraft operator entities 106 access the weather data source 110 and the weather service systems 10 thereof generate weather models, weather files, and weather messages at the corresponding aircraft operator entity 106 using the weather data received from the weather data source 110.

The aircraft operator entities 106 are responsible for delivering the weather messages to the corresponding aircraft 104 that are controlled thereby. In some embodiments, an aircraft operator entity 106 delivers the weather models and/or the weather files to the corresponding aircraft 104 controlled thereby. In the exemplary embodiment of FIG. 5, the subscription to the weather service provided by the weather service system 10 is a turnkey system subscription, which includes the installation and support of the weather service system 10 at the aircraft operator entity's 106 facility and licensing of associated technologies. Such a subscription may be suitable for relatively large network air carriers with relatively complex operational needs. In some embodiments, one or more of the aircraft operator entities 106 delivers a copy of a weather model, a weather file, and/or weather message to the ATC entity 108.

Within each of the embodiments of FIGS. 2-5, one or more weather service systems 10 are implemented within an air traffic environment in the same configuration for each aircraft operator entity that controls aircraft within the air traffic environment. In other words, within a particular air traffic environment, the subscription to the weather service is the same type of subscription for each aircraft operator entity that controls aircraft within the air traffic environment. For example, in the embodiment of FIG. 2, each aircraft operator entity 106 of the air traffic environment 100 is served by the weather service system 10 that is installed at the facility of the weather service provider 102. Moreover, and for example, in the embodiment of FIG. 3, each aircraft operator entity 106 of the air traffic environment 200 has a subscription wherein an WMGS 14 of the weather service system 10 is installed at the facility of each of the aircraft operator entities 106. But, the weather service system 10 is not limited to providing the same type of subscription for each aircraft operator entity that controls aircraft within the same air traffic environment. Rather, different types of subscriptions may be provided for different aircraft operator entities that control aircraft within the same air traffic environment. In other words, a single air traffic environment may include a combination of different configurations (i.e., subscription types) for different aircraft operator entities (e.g., a combination of the different configurations shown in FIGS. 2, 3, 4, and/or 5).

Figure 6:
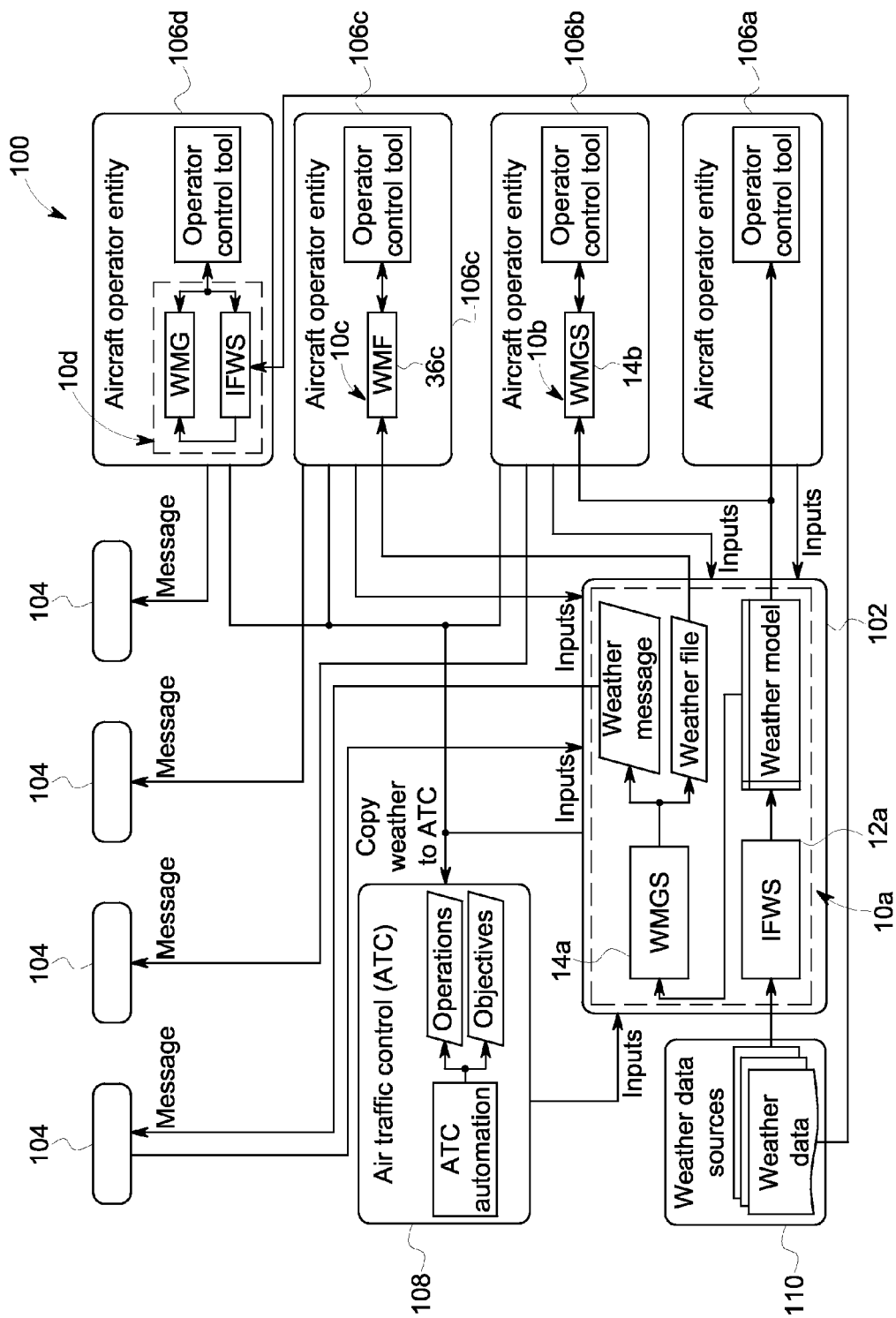
FIG. 6 is a schematic block diagram of yet another exemplary embodiment of an air traffic environment illustrating yet another exemplary implementation of the weather service system shown in FIG. 1.

For example, FIG. 6 is a schematic block diagram of another exemplary embodiment of an air traffic environment 500 illustrating another exemplary implementation of the weather service system 10. The embodiment of FIG. 6 is a combination of the embodiments of FIGS. 2-5. Specifically, the air traffic environment 500 includes a plurality of different aircraft operator entities 106a, 106b, 106c, and 106d that each control one or more aircraft 104a, 104b, 104c, and 104d, respectively. For the aircraft operator entity 106a, an entire weather service system 10a is installed at the facility of the weather service provider entity 102. The weather service system 10a provides weather service to the aircraft operator entity 106a. The subscription of the aircraft operator entity 106a to the weather service is for the delivery of weather messages to the aircraft 104a directly from the weather service system 10a at the weather service provider 102.

For the aircraft operator entity 106b, a weather service system 10b includes a WMGS 14b that is installed at the facility of the aircraft operator entity 106b. In addition to the WMGS 14b, the weather service system 10b uses an IFWS 12a of the weather service system 10a to provide weather service to the aircraft operator entity 106b. In other words, the weather service system 10b includes the IFWS 12a of the weather service system 10a. The subscription of the aircraft operator entity 106b to the weather service is for the delivery of weather models to the aircraft operator entity 106b and licensing and support of the WMGS 14b.

For the aircraft operator entity 106c, a weather service system 10c includes a WMF module 36c that is installed at the facility of the aircraft operator entity 106c. In addition to the WMF module 36c, the weather service system 10c uses the other components of a WMGS 14a of the weather service system 10a and the IFWS 12a to provide weather service to the aircraft operator entity 106c. In other words, the weather service system 10c includes the IFWS 12a and the WMGS 14a (except for a WMF module 36 of the WMGS 14a) of the weather service system 10a. The subscription of the aircraft operator entity 106c to the weather service is for the delivery of weather files to the aircraft operator entity 106c and licensing and support of WMF module 36c.

For the aircraft operator entity 106d, an entire weather service system 10d is installed at the facility of the aircraft operator entity 106d. The weather service system 10d provides weather service to the aircraft operator entity 106d. The subscription of the aircraft operator entity 106d to the weather service is a turnkey system subscription, which includes the installation and support of the weather service system 10d at the aircraft operator entity's 106d facility and licensing of associated technologies.

Figure 7:
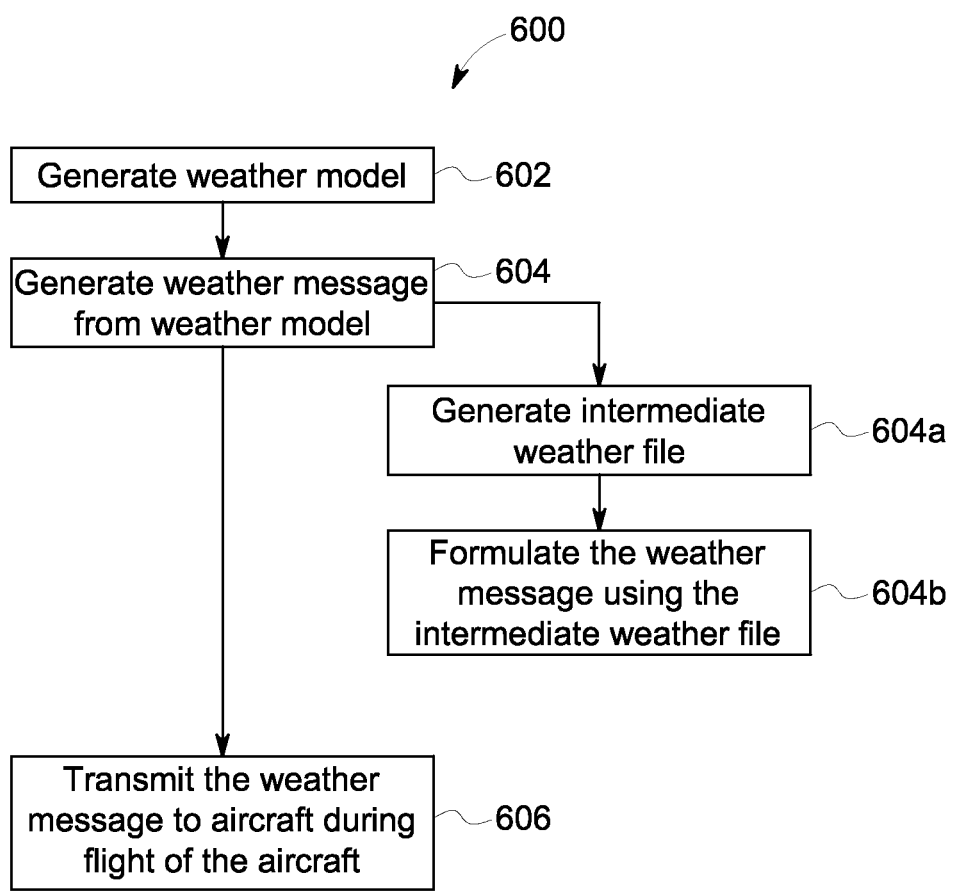
FIG. 7 is a flowchart illustrating an exemplary embodiment of a method for providing one or more aircraft with weather data during flight.

FIG. 7 is a flowchart illustrating an exemplary embodiment of a method 600 for providing one or more aircraft with weather data during flight. The method 600 may be performed, for example, using the weather service system 10 (FIGS. 1-6). At 602, the method 600 includes generating one or more weather models using one or more sources of weather data. Generating a weather model at 602 may include creating a new weather model or updating an existing weather model. The weather model may be generated at 602 upon receiving a request for weather service (e.g., a request for a weather message) from an aircraft, an aircraft operator entity that controls operation of one or more aircraft, and/or an ATC entity. In addition or alternatively, generation of the weather model at 602 may be initiated automatically upon the occurrence of a predetermined event, such as, but not limited to, a predetermined weather event and/or the like. The weather model generated at 602 may have any form, format, and/or the like, such as, but not limited to, the form of a 4D grid and/or the like.

As described above with respect to the weather service system 10, weather models generated at 602 incorporate flight operations information and performance requirements. As should be apparent from the above description of the weather service system 10, the flight operations information may include, but is not limited to, a specified airspace within which an aircraft are intended to fly, a configuration of the specified airspace, a type of flight procedure, and/or the like. As should also be apparent from the above description of the weather service system 10, the performance requirements may include, but are not limited to, an RNP for a flight or a flight procedure of an aircraft, traffic throughput in terms of flight flow rate, a flight profile, a performance based flight profile, a weather model parameter, a weather model specification, a weather performance requirement, or a weather model requirement.

In one exemplary embodiment, the weather model is generated at 602 by integrating the flight operations information and the performance requirements to determine weather performance requirements, receiving weather data from the source of weather data, and generating the weather model according to the weather data and the weather performance requirements. Such an exemplary method for generating at 602 the weather model will be described below in more detail with reference to FIG. 9. In addition or alternatively, any other method for generating at 602 the weather model may be used.

In some embodiments, the weather model generated at 602 is transmitted to one or more aircraft, one or more aircraft operator entities that control operation of aircraft, and/or one or more ATC entities.

At 604, the method 600 includes generating one or more weather messages from the weather model(s). The weather message is generated at 604 in a format that is compatible with the aircraft. For example, the weather message may be generated at 604 in a format that is capable of being received by the aircraft and capable of being automatically uploaded into an airborne automation system of the aircraft and/or automatically displayed to a crew of the aircraft. In one exemplary embodiment, the weather message is generated at 604 by generating, at 604a, an intermediate weather file by reducing the weather model to a subset of weather data, and using at 604b the intermediate weather file to formulate the weather message according to one or more weather message encoding rules of an aircraft that is being provided with the weather service. In addition or alternatively, any other method for generating at 604 the weather message may be used. In some embodiments, the intermediate weather file is transmitted to one or more aircraft, one or more aircraft operator entities that control operation of aircraft, and/or one or more ATC entities.

The method 600 includes, at 606, transmitting the weather message to one or more aircraft during flight of the aircraft. For example, the weather message may be transmitted at 606 to one or more aircraft that have requested weather service (whether the request was made directly by the aircraft and/or through an aircraft operator entity that controls operation of the aircraft) and/or may be transmitted at 606 to one or more aircraft that are operating within an air traffic environment being serviced by the weather service system 10. The weather message may be transmitted at 606 to the aircraft directly, or may be transmitted at 606 to the aircraft by first being transmitted to an aircraft operator that controls operation of the aircraft and then being relayed to the aircraft by the aircraft operator. In some other embodiments, the weather message is transmitted to directly to both the aircraft and one or more aircraft operator entities. Moreover, in some embodiments, the weather message is transmitted to an ATC entity.

Figure 8:
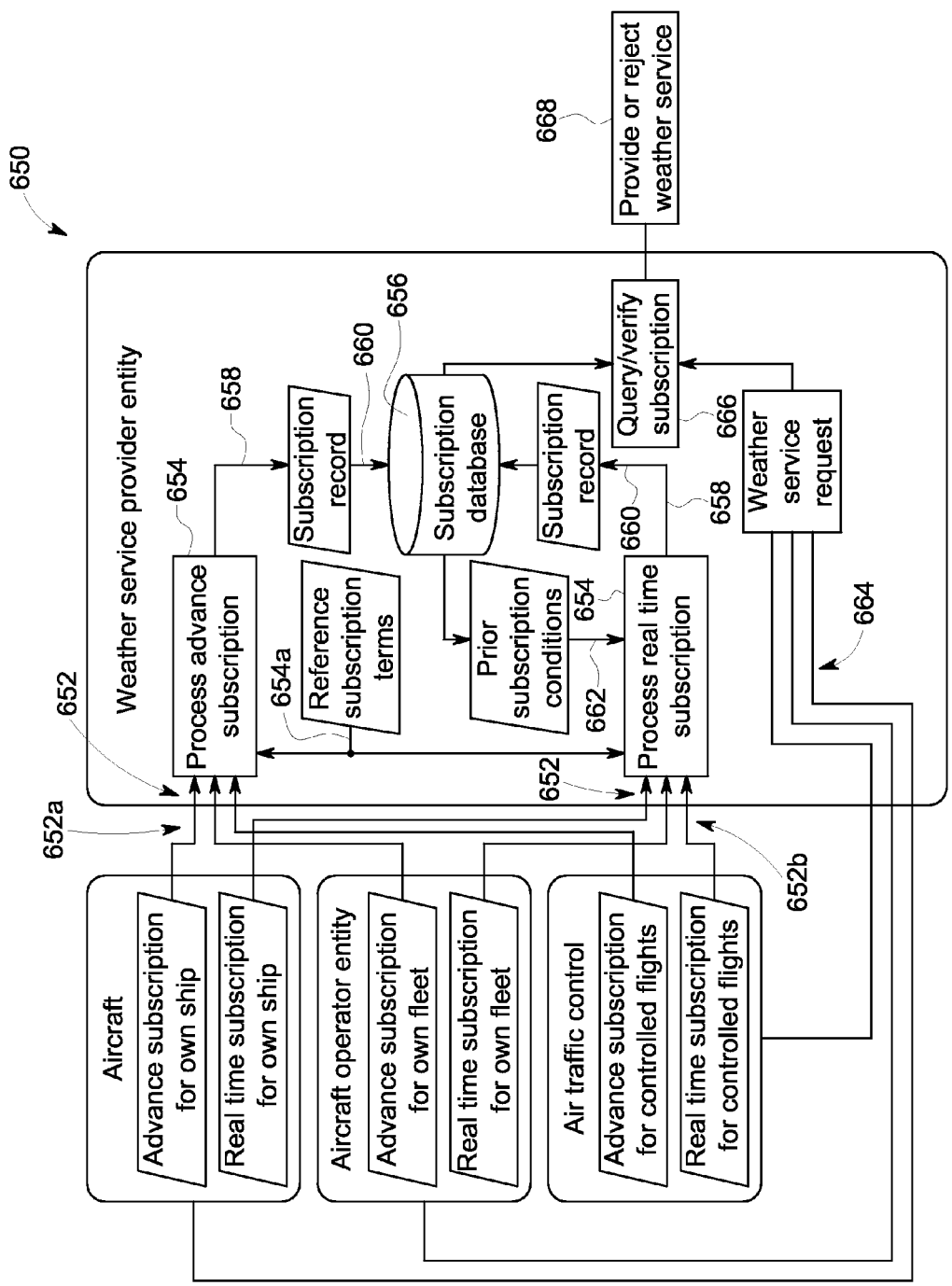
FIG. 8 is a flowchart illustrating an exemplary embodiment of a method for managing subscription to a weather service.

FIG. 8 is a flowchart illustrating an exemplary embodiment of a method 650 for managing subscription to a weather service that provides one or more aircraft with weather data during flight. For example, the method 650 may be used to manage subscription to a weather service provided by the weather service system 10 (FIGS. 1-6). The method 650 illustrates an exemplary embodiment of a method of receiving, recording, and verifying the subscription of weather services by a weather service provider entity (e.g., an entity that operates the weather service system 10) such that weather services can be provided to the subscription entities accordingly.

The method 650 includes, at 652, receiving subscription requests that request subscription to the weather service. The subscription requests may be received at 652a in advance of the receipt of a weather service request by the weather service provider entity. In addition or alternatively, the subscription requests may be received at 652b simultaneously (i.e., in real-time) with the receipt of a weather service request by the weather service provider entity. As should be apparent from FIG. 8, each subscription request received by the weather service provider entity may be received from a particular aircraft for that particular aircraft, from an aircraft operator entity for a subset or all of the aircraft of a fleet of the aircraft operator entity, or from an ATC entity for a subset or all of the flights in the jurisdiction of the ATC entity.

At 654, the method 650 includes processing the subscription requests. Specifically, a subscription is negotiated between the subscriber and the weather service provider entity. In some embodiments, pre-defined reference subscription terms may be referenced at 654a during the negotiation. Upon successful negotiation, a subscription record is generated at 658 and stored at 660 as machine readable code in a subscription database 656. In other words, the method 650 includes, at 658 and 660, recording in the subscription database 656 valid subscriptions to the weather service that are based on the subscription requests received at 652. The recorded subscriptions may reflect the subscription status of a specific aircraft, may reflect the subscription status of one or more flights conducted by aircraft belonging to an aircraft operator entity, and/or may reflect the subscription status of one or more flights in the jurisdiction of an ATC entity. In addition or alternatively, the recorded subscriptions may indicate the level of service, such as, but not limited to, limits on the number of weather messages to be delivered, the type, extent, scope, volume and/or the like of service to be provided, and/or updates to the service or messages to be delivered. Functionalities may be provided for querying and verifying the subscription status of a weather service request for use by the operator of the weather service provider entity via a connected display and/or for use by the weather service system via an electronic interface.

Real-time subscriptions may be for a one time weather service request, for services not covered by an advance subscription, and/or for a one time modification to an advance subscription. In addition to the pre-defined reference subscription terms which may be references at 654a, negotiated prior subscription conditions (e.g., extracted from the subscription database 656) with the subscriber may also be referenced, at 662, during a subscription negotiation.

An effective subscription includes financially charging a subscription request entity and/or an end user entity for the weather service provided. The charge may be based on the characteristics of the request and the weather service including factors such as, but not limited to, the type, extent, scope, volume, and/or the like of service provided, seasonal and/or time of the day adjustments, the variety of different weather message types being provided, the number of products being subscribed to, and/or the like. One or more subscriber identifications (ID) and/or one or more vehicle IDs can be used to cross reference or map the requesting user, the subscription database, and/or the billing system that is responsible for recording and collecting the financial changes in connection to the subscription-based weather service.

The method 650 includes providing weather services according to the subscription status and the weather service request. For example, the method 650 includes, at 664, receiving a weather service request for one or more aircraft. The weather service request requests weather data from the weather service during flight of the aircraft. The weather service request may be received at 664 from one or more aircraft, from one or more aircraft operator entities, and/or from an ATC entity. At 666, the method 650 includes verifying a subscription status of the aircraft by comparing the weather service request with the valid subscriptions in the subscription database. The method 650 further includes, at 668, providing or rejecting the weather service according to the subscription status of the aircraft.

Figure 9:
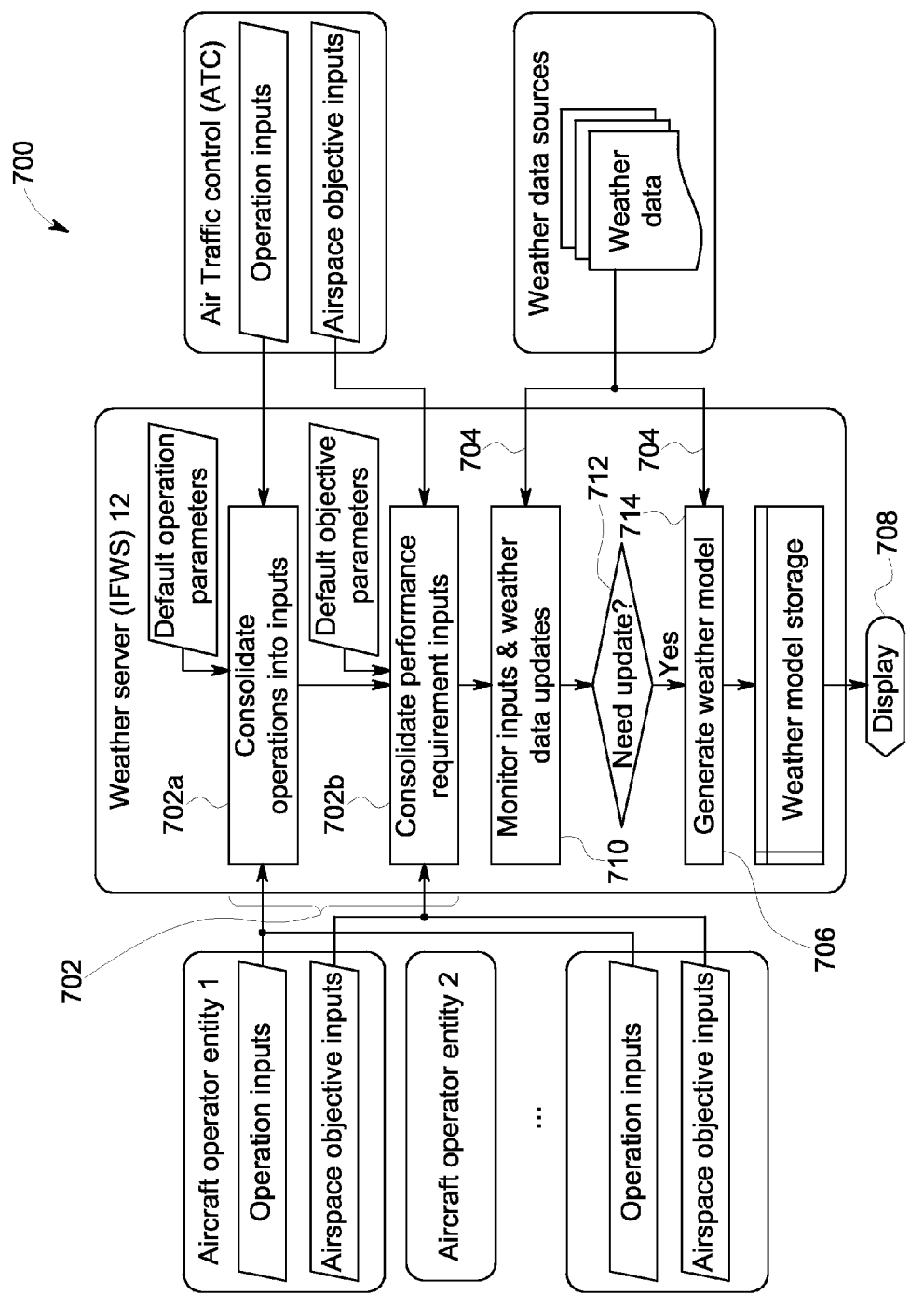
FIG. 9 is a flowchart illustrating an exemplary embodiment of a method for generating one or more weather models.

FIG. 9 is a flowchart illustrating an exemplary embodiment of a method 700 for generating one or more weather models. For example, the method 700 may be used to perform all or a portion of the generation step 602 (FIG. 7) of the method 600 (FIG. 7). The method 700 includes, at 702, integrating flight operations information and performance requirements to determine weather performance requirements. The flight operations information and the performance requirements are integrated at 702 by consolidating at 702a flight operations information inputs for one or more aircraft (e.g., received from a corresponding aircraft operator entity) with flight operations information inputs from an ATC entity. Default operation parameters may be used as the starting point for the consolidation at 702a and to fill gaps in the input data. Integrating at 702 the flight operations information and the performance requirements also includes, at 702b, consolidating performance requirement inputs for one or more aircraft (e.g., received from a corresponding aircraft operator entity) with performance requirement inputs of the ATC entity. Default airspace objective parameters may be used as the starting point for the consolidation at 702b and to fill gaps in the input data. The input consolidation processes of 702a and 702b may allow for the interests from all stakeholders to be reflected in the weather model.

Consolidated inputs are carried over to the next step to control the process of various weather data sources. Specifically, at 704, the method 700 includes receiving weather data from one or more sources of weather data. At 706, the method 700 further includes generating one or more weather models according to the processed weather data and the weather performance requirements. The weather model(s) may be displayed, at 708, to an operator of the weather service system for monitoring purposes. Moreover, and for example, stored weather models can be accessed by the operator of the weather service system via the WMAI module 26 (FIG. 1). Weather models may also be provided to a third party (e.g., an aircraft operator entity) automatically or manually if the weather model is included in a service subscription.

In continuous operations, weather models may need to be updated to reflect changes in weather data and/or changes in flight operations and/or performance requirements. Updating a weather model may be achieved by monitoring any inputs, changes, and/or updates of one or more weather data sources. Accordingly, in some embodiments, the method 700 includes monitoring, at 710, one or more inputs, changes, and/or updates of one or more weather data sources. The input, change, and/or update is then compared, at 712, with weather model update criteria derived from the flight operations information and performance requirements. At 714, the weather model(s) is then updated to reflect the input, change, and/or update of the weather data source(s).

Figure 10:
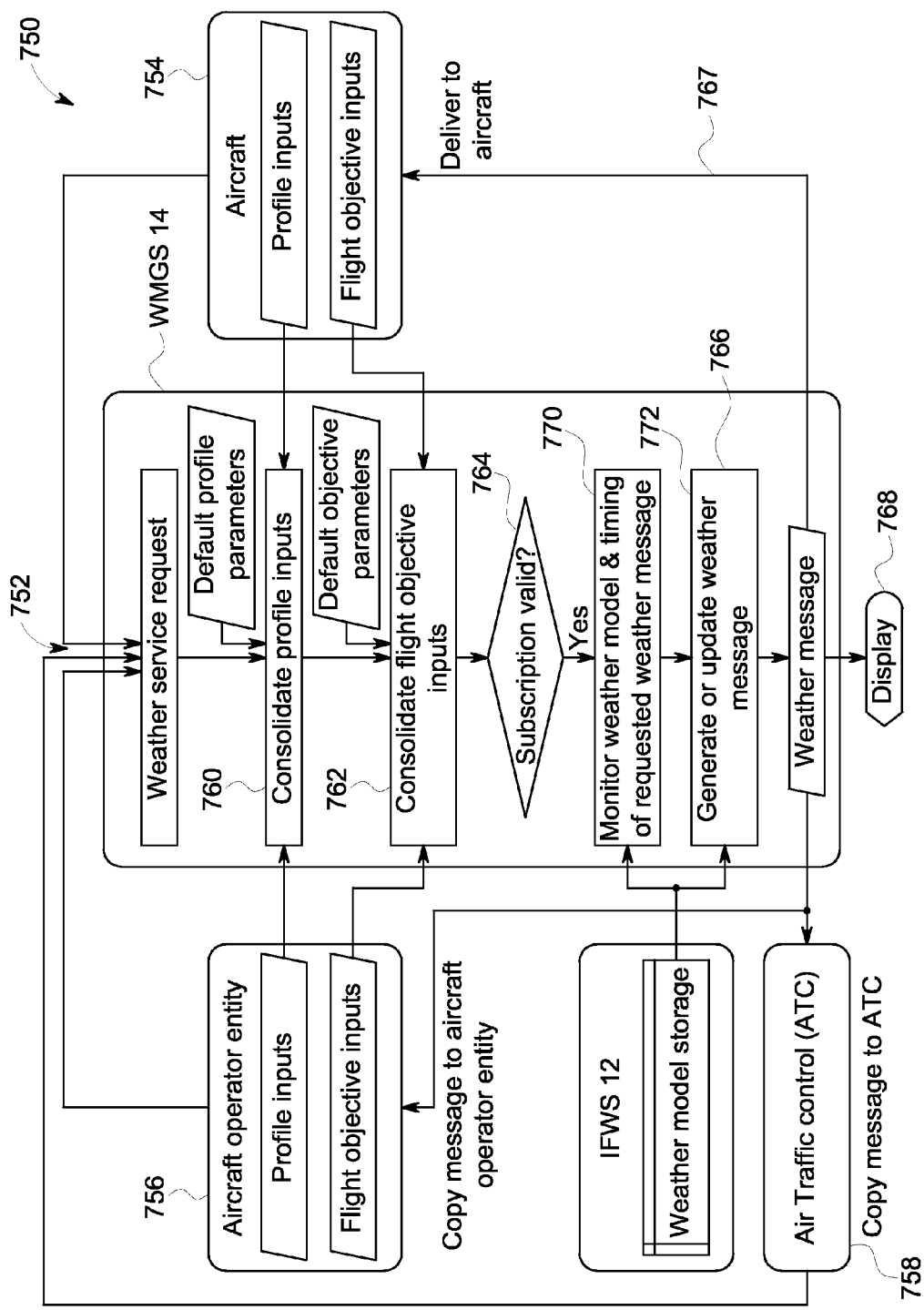
FIG. 10 is a flowchart illustrating an exemplary embodiment of a method for generating one or more weather messages from one or more weather models.

FIG. 10 is a flowchart illustrating an exemplary embodiment of a method 750 for generating one or more weather messages from one or more weather models. For example, the method 750 may be used to perform all or a portion of the generation step 604 (FIG. 7) of the method 600 (FIG. 7). The method 750 is a method of providing subscription weather service to an individual flight by utilizing the WMGS 14 to access one or more weather models generated by the IFWS 12 and to generate and deliver one or more weather messages.

The method 750 includes receiving, at 752, a weather service request for an individual aircraft 754. The weather service request may be received at 752 from the individual aircraft 754, from an aircraft operator entity 756 that controls operation of the individual aircraft 754, and/or from an ATC entity 758. When a weather service request for an individual flight is received at 752, the method 750 may include consolidating, at 760, flight profile inputs (i.e., profile specification parameters), received from the individual aircraft and/or a corresponding aircraft operator entity, with default flight profile parameters. The default flight profile parameters may be used as the starting point for the consolidation 760 and to fill gaps in the input data. At 762, the method may also include consolidating flight objective inputs (i.e., flight objective specification parameters), received from the individual aircraft 754 and/or the corresponding aircraft operator entity 756, with default flight objective parameters. The default flight profile parameters may be used as the starting point for the consolidation 762 and to fill gaps in the input data. The consolidation of inputs from different entities may offer the flexibility for the service requester to specify additional details about the service request if so desired, and/or may offer the possibility for an aircraft user to incorporate weather services into ground based automation and/or an airborne automation tool.

At 764, the method 750 includes verifying the subscription status of the individual aircraft. If the subscription status is effective (i.e., valid), one or more weather messages is generated at 766 from the weather model(s). The weather message is generated at the requested time and delivered, at 767, to the individual aircraft via available communication channels. The subscription may also include delivery of a copy of the weather message to the aircraft operator entity 756 that controls operation of the individual aircraft 754. In some embodiments, instead of being directly transmitted to the individual aircraft 754, the weather message is transmitted to the aircraft operator entity 756 and is relayed to the individual aircraft 754 by the aircraft operator entity 756. If desired, as may be indicated in airspace objective inputs from the ATC entity 758, a copy of the weather message may also be delivered to the ATC entity 758. The ATC entity 758 may use the weather message to improve traffic management, for example. The weather message may be presented on a display 768 of the WMGS 14 for monitoring purposes.

The weather service subscription may also include updates of the weather messages. Accordingly, in some embodiments, the method 750 includes monitoring, at 770, updates to one or more weather models generated by the IFWS 12, which may include taking into account the requested timing (e.g., provided as part of the flight objective inputs) of a weather message update. When update criteria are met, the method 750 includes updating, at 772, one or more weather messages. The updated weather message(s) can then delivered as described herein.

Figure 11:
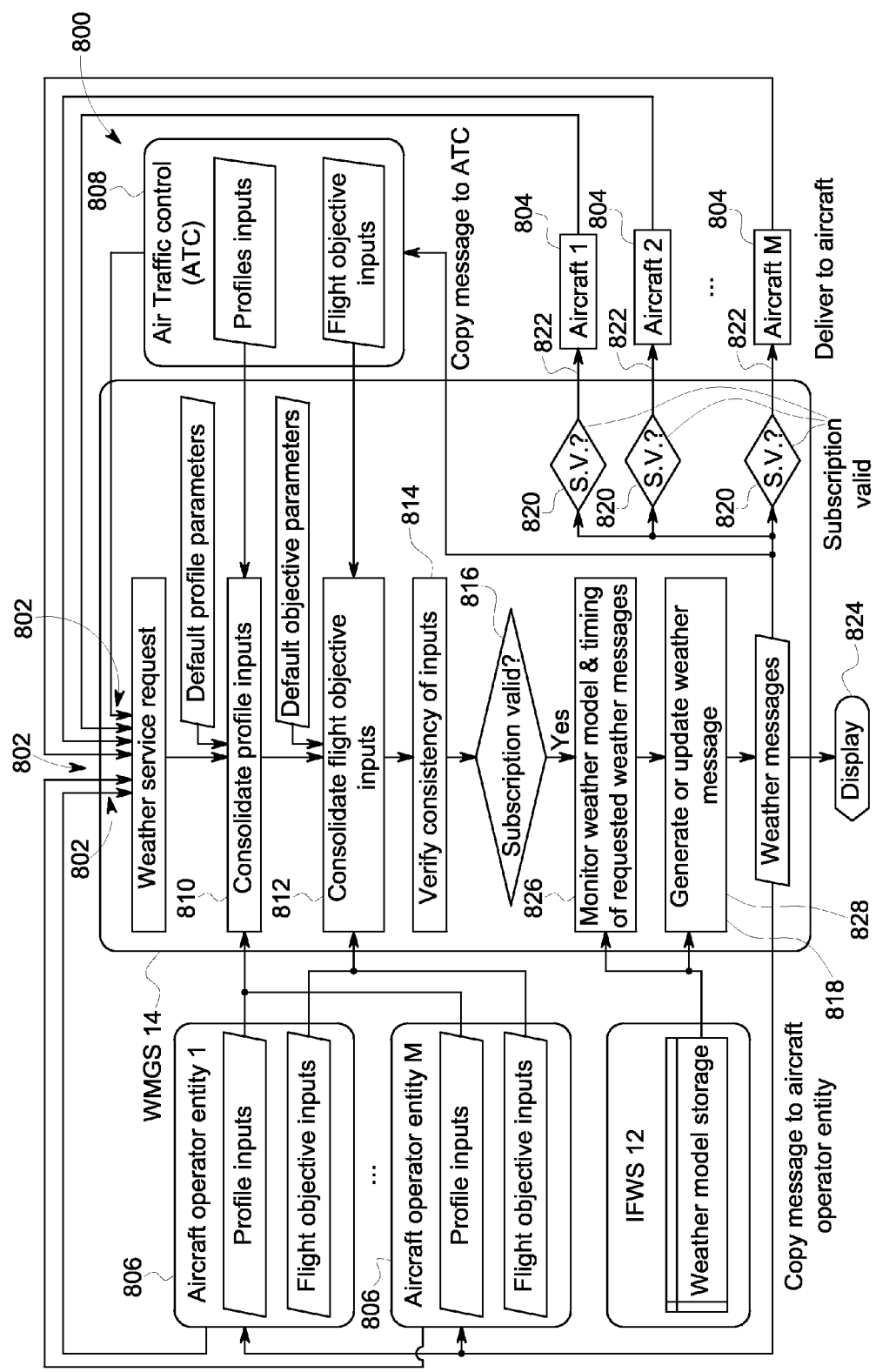
FIG. 11 is a flowchart illustrating another exemplary embodiment of a method for generating one or more weather messages from one or more weather models.

FIG. 11 is a flowchart illustrating another exemplary embodiment of a method 800 for generating one or more weather messages from one or more weather models. For example, the method 800 may be used to perform all or a portion of the generation step 604 (FIG. 7) of the method 600 (FIG. 7). The method 800 is a method of providing subscription weather service to a plurality of flights that are conducting similar operations by utilizing the WMGS 14 to access one or more weather models generated by the IFWS 12 and to generate and deliver one or more weather messages.

The method 800 includes receiving, at 802, a weather service request for a plurality of aircraft 804 that are conducting similar operations. The weather service request may be received at 802 from one or more of the aircraft 804, from an aircraft operator entity 806 that controls operation of one or more of the aircraft 804, and/or from an ATC entity 808. The method 800 may include consolidating, at 810, flight profile inputs (i.e., profile specification parameters) with default flight profile parameters. The flight profile inputs may be received from one or more of the aircraft operator entities 806 and/or from the ATC entity 808. The default flight profile parameters may be used as the starting point for the consolidation 810 and to fill gaps in the input data. At 812, the method may also include consolidating flight objective inputs (i.e., flight objective specification parameters) with default flight objective parameters. The flight objective inputs may be received from one or more of the aircraft operator entities 806 and/or from the ATC entity 808. The default flight profile parameters may be used as the starting point for the consolidation 812 and to fill gaps in the input data. Because the inputs may be provided from more than one entity (i.e., from two or more aircraft operator entities 806 or from a combination of the ATC entity 808 and one or more aircraft operator entities 806), the method 800 may include verifying, at 814, the consistency of the inputs. The consolidation of inputs from different entities may offer the flexibility for the service requester to specify additional details about the service request if so desired, and/or may offer the possibility for an aircraft user to incorporate weather services into ground based automation and/or an airborne automation tool.

After receiving the weather service request at 802, the method 800 includes verifying, at 816, the subscription status of the plurality of aircraft 804. For example, verifying at 816 may include verifying the subscription status of the weather service request. If the subscription status is effective for at least a subset of the plurality of aircraft 804, the weather service request will be processed. Specifically, if the subscription status is effective for at least a subset of the plurality of aircraft 804, the method 800 includes generating, at 818, one or more weather messages (using one or more weather models generated by the IFWS 12) at the requested time. Because a plurality of flights are involved, more than one weather message may be necessary to satisfy the needs of aircraft 804 with different equipage. But, the weather messages may be formulated from the same weather file because of the similar operations being executed by the flights in question.

Before the delivery of the weather messages, the method 800 includes verifying, at 820, the subscription status for each individual flight of the plurality of aircraft 804. If the subscription is effective for a flight, the corresponding weather message is delivered, at 822, to the aircraft 804 via available communication channels. If the same weather message (e.g., with a specific encoding for a given airborne system) suits more than one aircraft 804, a single transmission may reach the aircraft at the same time, which is referred to as a "subscription weather message broadcast". Such subscription weather message broadcasts may save communication bandwidth. When a subscription weather message is broadcasted, the message may include an addressing mechanism such as a special identifier in the message that can be recognized by only the aircraft 804 with subscription and/or such as an encryption mechanism that allows for only aircraft 804 with subscription to decode the weather message. Accordingly, in some embodiments, it may not be necessary to verify subscription status before the weather message is transmitted.

The subscription may also include delivery of a copy of the weather message to one or more of the aircraft operator entities 806. In some embodiments, instead of being directly transmitted to one or more of the aircraft 804, the weather message is transmitted to one or more of the aircraft operator entities 806 for relay to the one or more aircraft 804. If desired, as may be indicated in airspace objective inputs from the ATC entity 808, a copy of the weather message may also be delivered to the ATC entity 808. For example, the ATC entity 808 may use the weather message to improve traffic management. The weather message may be presented on a display 824 of the WMGS 14 for monitoring purposes.

Because the method 800 applies to a plurality of aircraft 804, which may enter and leave the airspace at different times, a particular weather file or weather message may only apply to a given period of time, for example because of the aging of the weather information. Accordingly, weather files and/or weather messages may need to be updated as the corresponding weather model(s) is updated, for example even if the profile specification inputs and the flight objective inputs remain the same for all flights in question. Unlike the method 700 wherein updated versions of the same weather message may be delivered to the same flight as time elapses, in the method 800, updated weather messages may only be delivered to new flights. Accordingly, in some embodiments, the method 800 includes monitoring, at 826, updates to one or more weather models generated by the IFWS 12, which may include taking into account weather message update criteria derived from (or given as part of) flight profile specification inputs and flight objective specification inputs. When update criteria are met, the method 800 includes updating, at 828, one or more weather messages. The updated weather message (s) can then be delivered as described herein, but may only be addressed to new flights coming into the airspace or predicted to coming into the airspace at a given time in the future. As an alternative method, a time criterion or a flight progress criterion (such as, but not limited to, a waypoint being reached, an altitude being reached, and/or the like) is configured in the aircraft 804 to receive weather messages up to that specified waypoint, altitude, and/or the like. After the specified waypoint, altitude, and/or the like is reached, the aircraft 804 will no longer update an internal weather model of the aircraft 804 even if a new weather message broadcast is available.

Figure 12:
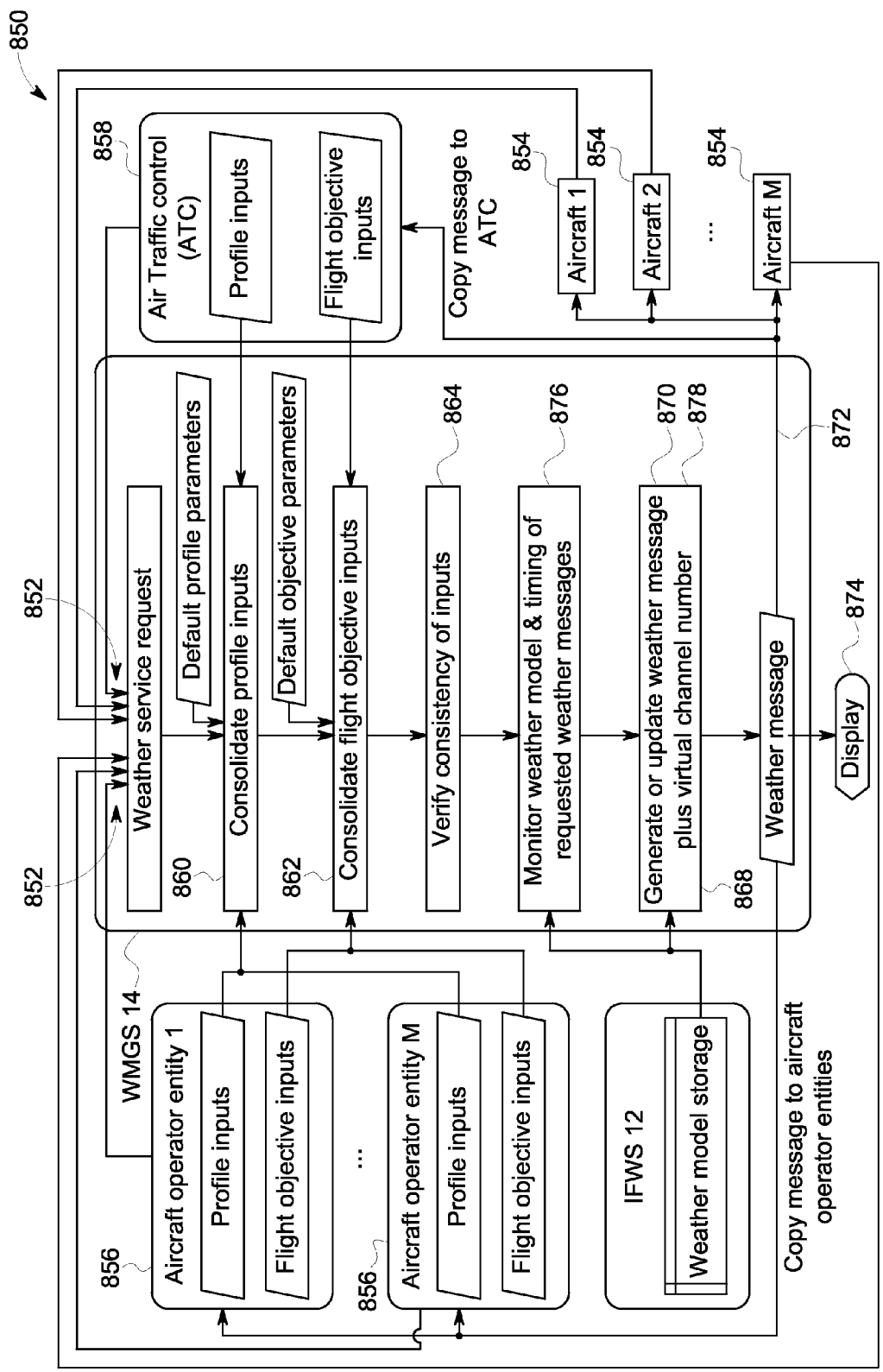
FIG. 12 is a flowchart illustrating another exemplary embodiment of a method for generating one or more weather messages from one or more weather models.

FIG. 12 is a flowchart illustrating another exemplary embodiment of a method 850 for generating one or more weather messages from one or more weather models. For example, the method 850 may be used to perform all or a portion of the generation step 604 (FIG. 7) of the method 600 (FIG. 7). The method 850 is a method of providing subscription weather service to a plurality of flights that are conducting similar operations by utilizing the WMGS 14 to access one or more weather models generated by the IFWS 12 and to generate and deliver one or more weather messages. The method 850 is similar to the method 800 (FIG. 11); however, one difference between the method 850 and the method 800 is that in the method 850 there is an advance weather service subscription in place that covers all flights controlled by a single ATC entity 858. The subscription may actually be put into place by the ATC entity 858 to ensure the all flights served by the ATC entity 858 receive the same level of weather service, for example to maximize throughput and/or to minimize environmental impact.

The method 850 includes receiving, at 852, a weather service request for a plurality of aircraft 854 that are conducting similar operations. The weather service request may be received at 852 from one or more of the aircraft 854, from an aircraft operator entity 856 that controls operation of one or more of the aircraft 854, and/or from the ATC entity 858. The method 850 may include consolidating, at 860, flight profile inputs (i.e., profile specification parameters) with default flight profile parameters. The flight profile inputs may be received from one or more of the aircraft operator entities 856 and/or from the ATC entity 858. The default flight profile parameters may be used as the starting point for the consolidation 860 and to fill gaps in the input data. At 862, the method may also include consolidating flight objective inputs (i.e., flight objective specification parameters) with default flight objective parameters. The flight objective inputs may be received from one or more of the aircraft operator entities 856 and/or from the ATC entity 858. The default flight profile parameters may be used as the starting point for the consolidation 862 and to fill gaps in the input data. Because the inputs may be provided from more than one entity (i.e., from two or more aircraft operator entities 856 or from a combination of the ATC entity 858 and one or more aircraft operator entities 856), the method 850 may include verifying, at 864, the consistency of the inputs. The consolidation of inputs from different entities may offer the flexibility for the service requester to specify additional details about the service request if so desired, and/or may offer the possibility for an aircraft user to incorporate weather services into ground based automation and/or an airborne automation tool.

Because subscription is already in place for all flights controlled by the ATC 858, no subscription verification is performed. At 868, the method 850 includes generating one or more weather messages (using one or more weather models generated by the IFWS 12). Because a plurality of flights are involved, more than one weather message may be necessary to satisfy the needs of aircraft 854 with different equipage. But, the weather messages may be formulated from the same weather file because of the similar operations being executed by the flights in question. The method 850 includes attaching, at 870, a virtual channel number to the weather message. For example, the virtual channel number may be included within the weather message. The virtual channel number indicates (i.e., identifies) the subset of aircraft 854 to which it is intended to deliver a weather message, for example aircraft 854 conducting similar operations (e.g., performing the same procedure) and having the same airborne system configuration.

Because there is no need to verify individual subscription status, a weather message does not have to be specifically addressed to an individual flight and the broadcast method can be used to deliver weather messages. Accordingly, the method 850 includes broadcasting, at 872, one or more weather messages to the intended subset of aircraft 854 via available communication channels. The method 850 may be referred to as an "open weather message broadcast". Such subscription weather message broadcasts may save communication bandwidth. The subscription may also include delivery of a copy of the weather message to one or more of the aircraft operator entities 856. Moreover, in some embodiments, instead of being directly broadcast to the aircraft 854, the weather message may be broadcast to one or more of the aircraft operator entities 856 for relay to the one or more aircraft 854. If desired, a copy of the weather message may also be delivered to the ATC entity 858, which for example may use the weather message to improve traffic management. The weather message may be presented on a display 874 of the WMGS 14 for monitoring purposes.

The broadcasted weather message includes the virtual channel number attached thereto. In the aircraft 854, the airborne systems are configured to identify the virtual channel number contained in the weather message broadcast. When the virtual channel number contained in the weather message matches that of the particular aircraft 854, the weather message is accepted; otherwise the weather message is ignored.

Weather files and/or weather messages may need to be updated as the corresponding weather model(s) is updated, for example even if the profile specification inputs and the flight objective inputs remain the same for all flights in question. Accordingly, in some embodiments, the method 850 includes monitoring, at 876, updates to one or more weather models generated by the IFWS 12, which may include taking into account weather message update criteria derived from (or given as part of) flight profile specification inputs and flight objective specification inputs. When update criteria are met, the method 850 includes updating, at 878, one or more weather messages.

When updated messages (e.g., a subsequent broadcast) is detected by an aircraft 854, a time criterion or a flight progress criterion (such as, but not limited to, a waypoint being reached, an altitude being reached, and/or the like) is configured in the aircraft 804 to control the acceptance of the weather message broadcast. Before the specified waypoint, altitude, and/or the like is reached, a weather message with the matching virtual channel number is accepted. After the specified waypoint, altitude, and/or the like is reached, a weather message is ignored even if it has a matching virtual channel number.

Figure 13:
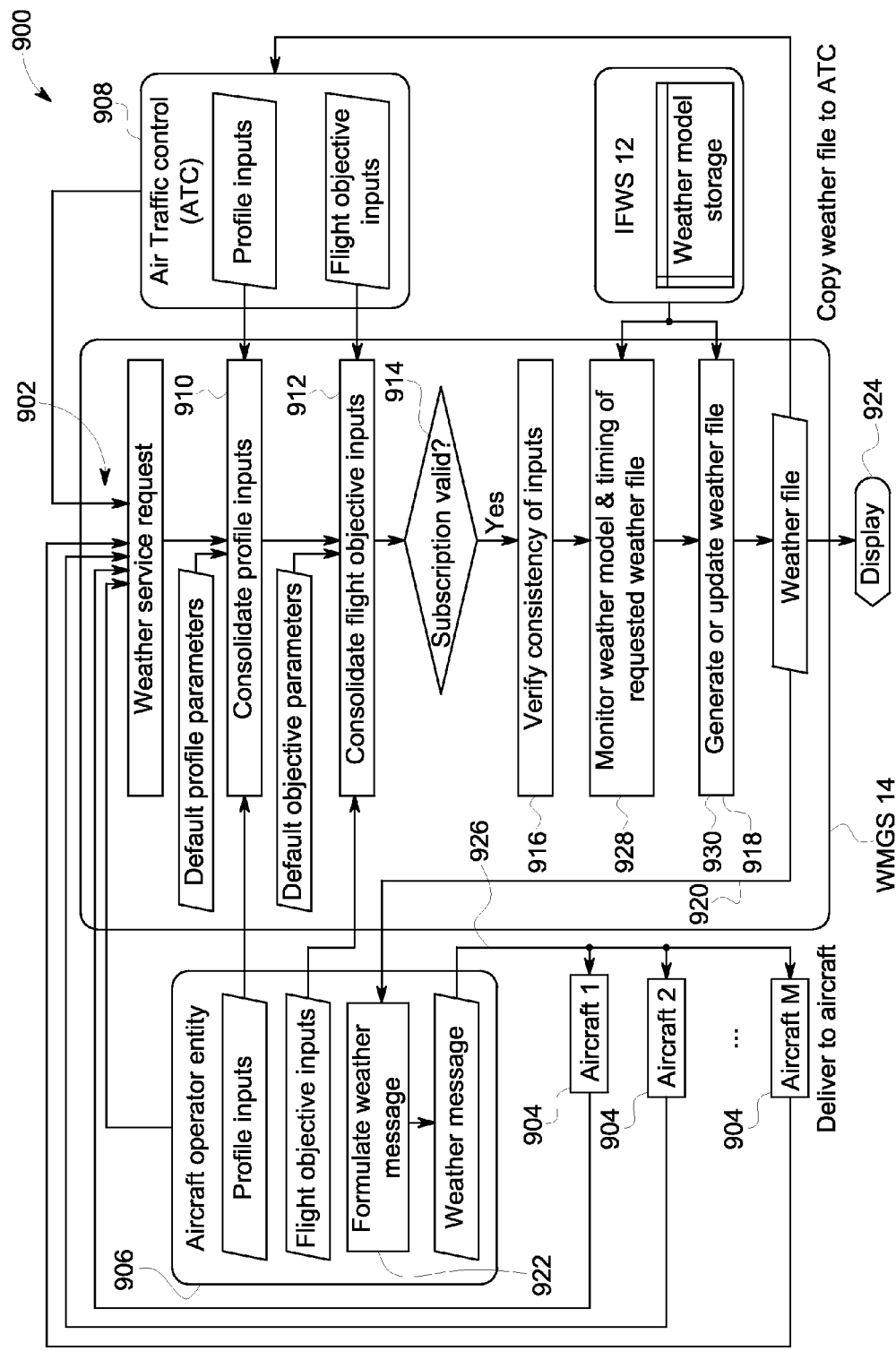
FIG. 13 is a flowchart illustrating yet another exemplary embodiment of a method for generating one or more weather messages from one or more weather models.

FIG. 13 is a flowchart illustrating another exemplary embodiment of a method 900 for generating one or more weather messages from one or more weather models. For example, the method 900 may be used to perform all or a portion of the generation step 604 (FIG. 7) of the method 600 (FIG. 7). The method 900 is a method of providing subscription weather service to a plurality of flights that are conducting similar operations by utilizing the WMGS 14 to access one or more weather models generated by the IFWS 12 and to generate and deliver one or more weather files. The method 900 is one exemplary implementation of the embodiment of the weather service system 10 shown in FIG. 4. For example, in the method 900, the weather messages are not generated at the facility of the weather service provider. Rather, only the intermediate weather files are generated at the facility of the weather service provider, while the weather messages are generated at the facility of an aircraft operator entity 906. In the method 900, there is an advance weather service subscription in place that covers a plurality of aircraft 904 that are controlled by a single aircraft operator entity 906.

The method 900 includes receiving, at 902, a weather service request for a plurality of aircraft 904 that are conducting similar operations. In the exemplary embodiment of FIG. 13, the weather service request is a request for a weather file. The weather service request may be received at 902 from one or more of the aircraft 904, from the aircraft operator entity 906, and/or from an ATC entity 908. The method 900 may include consolidating, at 910, flight profile inputs (i.e., profile specification parameters) with default flight profile parameters. The flight profile inputs may be received from the aircraft operator entity 906 and/or from the ATC entity 908. The default flight profile parameters may be used as the starting point for the consolidation 910 and to fill gaps in the input data. At 912, the method may also include consolidating flight objective inputs (i.e., flight objective specification parameters) with default flight objective parameters. The flight objective inputs may be received from the aircraft operator entity 906 and/or from the ATC entity 908. The default flight profile parameters may be used as the starting point for the consolidation 912 and to fill gaps in the input data.

After receiving the weather service request at 902, the method 900 includes verifying, at 914, the subscription status of the aircraft operator entity 906. The method 900 may include verifying, at 916, the consistency of the inputs received from the aircraft operator entity 906 and/or the ATC entity 908. The consolidation of inputs from different entities may offer the flexibility for the service requester to specify additional details about the service request if so desired, and/or may offer the possibility for an aircraft user to incorporate weather services into ground based automation and/or an airborne automation tool.

If the subscription status is effective for the aircraft operator entity 906, the method 900 includes generating, at 918, one or more intermediate weather files (using one or more weather models generated by the IFWS 12). The intermediate weather files are generated at 918 at the facility of the weather service provider. At 920, the intermediate weather file is transmitted from the weather service provider to the aircraft operator entity 906 via available communication channels. If desired, as may be indicated in airspace objective inputs from the ATC entity 908, a copy of the intermediate weather file may also be delivered to the ATC entity 908, which for example may use the weather file to improve traffic management. The weather file may be presented an a display 924 of the WMGS 14 for monitoring purposes.

The aircraft operator entity 906 is responsible for generating the weather messages and the delivering the weather messages to the aircraft 904 that are controlled thereby. Accordingly, the aircraft operator entity 906 generates, at 922, one or more weather messages using the received intermediate weather file(s). The aircraft operator entity 906 may generate at 922 the weather message at the facility of the aircraft operator entity 906, for example using an WMF module 36 (FIGS. 1, 4, and 6) installed at the facility of the aircraft operator entity 906. In addition or alternatively, the aircraft operator entity 906 may generate at 922 the weather message by accessing, for example via a network, an external weather message formulation functionality (e.g., a WMF module 36 of similar module) that is located remotely (i.e., is offsite) from the facility of the aircraft operator entity 906.

The delivery of weather messages to the aircraft 904 is controlled by the aircraft operator entity 906. Accordingly, the method 900 includes transmitting, at 926, the weather message(s) generated at 922 by the aircraft operator entity 906 from the facility of the aircraft operator entity 906 to the aircraft 904 via available communication channels.

As the corresponding weather model(s) is updated, weather files and the corresponding weather messages may need to be updated. Accordingly, in some embodiments, the method 900 includes monitoring, at 928, updates to one or more weather models generated by the IFWS 12, which may include taking into account weather message update criteria derived from (or given as part of) flight profile specification inputs and flight objective specification inputs. When update criteria are met, the method 900 includes updating, at 930, one or more weather files. The updated weather file(s) can then be delivered to the aircraft operator entity 906 as described herein. New weather files may be generated whenever updated weather models are available from the IFWS 12. New weather files may transmitted to the aircraft operator entity 906 (with a copy to the ATC entity 908 if desired) as soon as a new weather file is ready, unless the weather service request specifies otherwise. The weather service request may specify the nominal frequency, the minimum frequency, and/or the maximum frequency at which updated weather files are transmitted. The weather service request may specify the nominal time interval, minimum time interval, and/or maximum time interval between successively updated weather file transmissions. In addition or alternative to bring selected by the weather service request, the frequency and/or time intervals at which updated weather files are transmitted may be determined by a change of the weather by more than a tolerance or the change of the weather over a threshold.

Similar message update, delivery, and/or acceptance mechanisms described above for other exemplary methods can be employed for the aircraft operator entity 906 and the aircraft 904 controlled thereby, for example to manage the utilization of updated weather messages in aircraft operations.

The various embodiments of methods and systems of methods and systems described and/or illustrated herein may provide relatively accurate and/or relatively consistent weather forecast information to aircraft. For example, the various embodiments of methods and systems of methods and systems described and/or illustrated herein relates to creating, formatting, and/or transmitting relatively consistent weather information specific to individual and/or tailored to the performance requirements of a given operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer".

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for providing a fleet of aircraft with weather data during flight, the method comprising:
generating at least one weather model using a source of weather data, wherein the weather model incorporates flight operations information and performance requirements from the fleet of aircraft;
generating at least one weather message from the weather model, the weather message being generated in a format that is compatible with the fleet of aircraft;
managing a subscription to the weather message and determining at least one subscribed aircraft within the fleet of aircraft; and
transmitting the weather message to the subscribed aircraft during flight of the aircraft,
wherein generating the at least one weather message from the at least one weather model comprises:
receiving a weather service request for an individual aircraft;
verifying the subscription of the individual aircraft; and
if the subscription is effective, generating the weather message from the weather model; and wherein transmitting the weather message comprises transmitting the weather message at least one of directly to the individual aircraft or to an aircraft operator entity that controls operation of the individual aircraft.

2. The method of claim 1, further comprising transmitting the weather message to at least one of an air traffic control (ATC) entity or an aircraft operator entity that controls operation of one or more of the aircraft.

3. The method of claim 1, wherein generating the at least one weather model using the source of weather data comprises:
   integrating the flight operations information and the performance requirements to determine weather performance requirements;
   receiving weather data from the source of weather data; and
   generating the at least one weather model according to the weather data and the weather performance requirements.

4. The method of claim 3, wherein integrating the flight operations information and the performance requirements to determine weather performance requirements comprises:
   consolidating the flight operations information of the aircraft with flight operations information of an air traffic control (ATC) entity; and
   consolidating the performance requirements of the aircraft with performance requirement of the ATC entity.

5. The method of claim 3, wherein receiving weather data from the source of weather data comprises:
   monitoring at least one of an input, a change, or an update from the source of weather data;
   comparing the at least one of an input, a change, or an update with weather model update criteria derived from the flight operations information and performance requirements; and
   updating the at least one weather model.

6. The method of claim 1, wherein generating the at least one weather message in the format that is compatible with the fleet of aircraft comprises generating the at least one weather message in the format that is capable of being received by the subscribed aircraft and capable of being at least one of automatically uploaded into an airborne automation system of the subscribed aircraft or can be automatically displayed to a crew of the subscribed aircraft.

7. The method of claim 1, wherein generating the at least one weather message from the at least one weather model comprises:
   generating an intermediate weather file by reducing the at least one weather model to a subset of weather data;
   using the intermediate weather file to formulate the at least one weather message according to one or more weather message encoding rules of the subscribed aircraft.

8. The method of claim 1, wherein generating the at least one weather message from the at least one weather model comprises:
   receiving a weather service request for one or more of the fleet of aircraft;
   generating the at least one weather message using the at least one weather model; and
   attaching a virtual channel number to the weather message; and
   wherein transmitting the weather message comprises transmitting the weather message at least one of directly to one or more of the fleet of aircraft or to one or more aircraft operator entities that control operation of the plurality of aircraft.

9. The method of claim 1, wherein generating the at least one weather message from the at least one weather model comprises:
   receiving a weather service request for one or more of the fleet of aircraft controlled by a single aircraft operator entity;
   verifying the subscription of the aircraft operator entity;
   if the subscription is effective for the aircraft operator entity, generating a weather file using the weather model;
   transmitting the weather file to the aircraft operator entity;
   generating the weather message at least one of at the aircraft operator entity or by accessing a weather message formulation functionality from the aircraft operator entity; and
   wherein transmitting the weather message comprises transmitting the weather message to one or more of the fleet of aircraft from the aircraft operator entity.

10. The method of claim 1, wherein one or more of the fleet of aircraft are isolated from the source of the weather data.

11. The method of claim 1, wherein the flight operations information comprise at least one of a specified airspace within which the aircraft are intended to fly, a configuration of the specified airspace, or a type of flight procedure, and wherein the performance requirements comprise at least one of a Required Navigation Performance (RNP) for a flight or a flight procedure of the aircraft, traffic throughput in terms of flight flow rate, a flight profile, a performance based flight profile, a weather model parameter, a weather model specification, a weather performance requirement, or a weather model requirement.

12. The method of claim 1, further comprising transmitting the at least one weather model to at least one of an air traffic control (ATC) or an aircraft operator entity that controls operation of one or more of the fleet of aircraft.

13. The method of claim 1, wherein generating the at least one weather model comprises at least one of creating a new weather model or updating an existing weather model.

14. The method of claim 1, wherein generating the at least one weather model using the source of weather data comprises generating the weather model that has a form of at least one of a four dimensional (4D) grid, a three dimensional (3D) grid, a two dimensional (2D) grid, or a one dimensional (1D) sequence.

15. A weather service system for providing a fleet of aircraft with weather data during flight, the system comprising:
   an in-flight weather server (IFWS) comprising an operations specification (OS) module, an airspace objective specification (AOS) module, and a weather processing (WP) module, the WP module being operatively connected to the OS module and the AOS module, the WP module being configured to generate at least one weather model using a source of weather data, flight operations information received from the OS module, and performance requirements received from the AOS module; and
   a weather message generator (WMGS) operatively connected to the IFWS, the WMG being configured to receive the at least one weather model from the IFWS and generate a weather message from the at least one weather model for at least one aircraft, the WMGS being configured to generate the weather message in a format that is compatible with the aircraft, the WMGS being further configured to transmit the weather message to the aircraft during flight of the aircraft, wherein the WMGS is configured to receive a weather service request for the fleet of aircraft, verify a subscription status of the fleet of aircraft, generate the weather message using the weather model if the subscription status is effective for at least a subset of the fleet of aircraft, verify the subscription status of each of the fleet of aircraft, and, if the subscription status is effective for one or more individual aircraft of the fleet of aircraft, transmit the weather message at least one of directly to the one or more individual aircraft or to one or more aircraft operator entities that control operation of the one or more individual aircraft.

16. The weather service system of claim 15, wherein the IFWS comprises a model update dispatch (MUD) module that is configured to integrate the flight operations information and the performance requirements to determine weather performance requirements, the WP module being configured to receive weather data from the source of weather data and generate the weather model according to the weather data and the weather performance requirements.

17. The weather service system of claim 15, wherein the WMGS comprises a weather file generator (WFG) module that is configured to create an intermediate weather file by reducing the weather model to a subset of weather data, the WMGS further comprising a weather message formulation module (WMF) that is configured to use the intermediate weather file to formulate the weather message according to one or more weather message encoding rules of the aircraft.

18. The weather service system of claim 15, wherein the WMGS is configured to receive a weather service request for an individual aircraft, verify a subscription status of the individual aircraft, generate the weather message from the weather model if the subscription status is effective, and transmit the weather message at least one of directly to the individual aircraft or to an aircraft operator entity that controls operation of the individual aircraft.

19. The weather service system of claim 15, wherein the WMGS is configured to receive a weather service request for the fleet of aircraft, generate the weather message using the weather model, and attach a virtual channel number to the weather message, the virtual channel number identifying each of the fleet of aircraft requesting weather service, the WMGS being further configured to transmit the weather message at least one of directly to the fleet of aircraft or to one or more aircraft operator entities that control operation of the fleet of aircraft.

20. The weather service system of claim 15, wherein the WMGS is configured to receive a weather service request for the fleet of aircraft controlled by a single aircraft operator entity, verify a subscription status of the aircraft operator entity, generate a weather file using the weather model if the subscription status is effective for the aircraft operator entity, and transmit the weather file to the aircraft operator entity, wherein the aircraft operator entity generates the weather message at least one of at the aircraft operator entity or by accessing a weather message formulation functionality from the aircraft operator entity, and wherein the aircraft operator entity transmits the weather message to the fleet of aircraft.

* * * * *